United States Patent
Chan et al.

(10) Patent No.: US 12,243,347 B1
(45) Date of Patent: Mar. 4, 2025

(54) IMAGE COMPENSATION FOR FINGERPRINT SENSOR DEPLOYED IN A FLEXIBLE DEVICE

(71) Applicant: QUALCOMM Incorporated, San Diego, CA (US)

(72) Inventors: Kwokleung Chan, Sunnyvale, CA (US); Raj Kumar, San Diego, CA (US); Jessica Liu Strohmann, Cupertino, CA (US); Sandeep Louis D'Souza, San Diego, CA (US); Deepak Rajendra Karnik, San Diego, CA (US); Advait Prasad Koparkar, Mountain View, CA (US); Hasib Siddiqui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/545,744

(22) Filed: Dec. 19, 2023

(51) Int. Cl.
| | |
|---|---|
| *G06V 40/12* | (2022.01) |
| *G06T 5/50* | (2006.01) |
| *G06T 5/70* | (2024.01) |
| *G06V 10/82* | (2022.01) |
| *G06V 10/98* | (2022.01) |
| *G06V 40/13* | (2022.01) |

(52) U.S. Cl.
CPC ............ *G06V 40/1347* (2022.01); *G06T 5/50* (2013.01); *G06T 5/70* (2024.01); *G06V 10/82* (2022.01); *G06V 10/993* (2022.01); *G06V 40/1306* (2022.01); *G06T 2207/20081* (2013.01); *G06T 2207/20084* (2013.01); *G06T 2207/20224* (2013.01)

(58) Field of Classification Search
CPC .. G06V 40/1347; G06V 10/82; G06V 10/993; G06V 40/1306; G06T 5/50; G06T 5/70; G06T 2207/20081; G06T 2207/20084; G06T 2207/20224
See application file for complete search history.

(56) References Cited

U.S. PATENT DOCUMENTS

| | | | |
|---|---|---|---|
| 2017/0337410 A1* | 11/2017 | Wang | G06V 40/1306 |
| 2020/0264755 A1* | 8/2020 | Jin | G06F 3/0412 |
| 2021/0073511 A1* | 3/2021 | Buchan | G06F 21/32 |
| 2022/0137779 A1* | 5/2022 | Lin | G06F 3/0421 |
| | | | 345/178 |

\* cited by examiner

*Primary Examiner* — Premal R Patel
(74) *Attorney, Agent, or Firm* — QUALCOMM Incorporated

(57) ABSTRACT

Some methods may involve receiving fingerprint image data and a first set of background image data from a fingerprint sensor and determining first processed fingerprint image data via a subtraction of the first set of background image data from the fingerprint image data. Some methods may involve obtaining force data corresponding to a force applied to the fingerprint sensor when the fingerprint image data were obtained. Some methods may involve obtaining a second set of background image data corresponding to the force data. Some methods may involve determining second processed fingerprint image data based, at least in part, on the first processed fingerprint image data and the second set of background image data, and outputting the second processed fingerprint image data. In some examples, determining the second processed fingerprint image data may involve a machine learning model. Some examples may involve estimating residual noise based on the force data.

30 Claims, 18 Drawing Sheets

IMAGE COMPENSATION FOR FINGERPRINT SENSOR DEPLOYED IN A FLEXIBLE DEVICE

CROSS-REFERENCE TO RELATED APPLICATION

This application is related to International Application (PCT) No. PCT/CN2023/139721, which was filed on the same day that the present application was filed, which is entitled "FORCE-COMPENSATED FINGERPRINT IMAGING FOR FLEXIBLE DEVICE IMPLEMENTATIONS" and which is hereby incorporated by reference.

TECHNICAL FIELD

This disclosure relates generally to flexible devices, such as flexible display devices, that include fingerprint sensors and methods for using such devices.

DESCRIPTION OF THE RELATED TECHNOLOGY

Fingerprint sensors, including but not limited to ultrasonic fingerprint sensors, have been included in devices such as smartphones, cash machines and cars to authenticate a user. Some fingerprint sensors are being deployed in flexible display devices, such as flexible mobile phones. It can be challenging to obtain satisfactory fingerprint image data from a fingerprint sensor deployed in a flexible display device. Improved devices and methods for operating such devices would be desirable.

SUMMARY

The systems, methods and devices of the disclosure each have several innovative aspects, no single one of which is solely responsible for the desirable attributes disclosed herein.

Some innovative aspects of the subject matter described in this disclosure may be implemented in a method. The method may involve receiving, by a control system, fingerprint image data from a fingerprint sensor. The method may involve obtaining, by the control system, a first set of background image data. The method may involve determining, by the control system, first processed fingerprint image data via a subtraction of the first set of background image data from the fingerprint image data. The method may involve obtaining, by the control system, force data corresponding to a force applied to the fingerprint sensor when the fingerprint image data were obtained. The method may involve obtaining, by the control system, a second set of background image data corresponding to the force. The method may involve determining, by the control system, second processed fingerprint image data based, at least in part, on the first processed fingerprint image data and the second set of background image data. The method may involve outputting the second processed fingerprint image data.

In some examples, determining the second processed fingerprint image data may involve a machine learning model. According to some examples, determining the second processed fingerprint image data may involve providing the first processed fingerprint image data and the second set of background image data to a trained neural network implemented by the control system.

In some examples, the fingerprint image data may be obtained from an ultrasonic fingerprint sensor. In some such examples, the method may involve obtaining multiple sets of fingerprint image data from the fingerprint sensor, each set of fingerprint image data corresponding to a different range gate delay. Determining the second processed fingerprint image data may be based, in part, on at least one set of fingerprint image data from the multiple sets of fingerprint image data.

According to some examples, the method may involve estimating residual noise in the first set of background image data, the second set of background image data, or both. In some such examples, the method may involve determining an additional set of processed fingerprint image data based, at least in part, on the first processed fingerprint image data and a residual noise estimate or on the second processed fingerprint image data and the residual noise estimate.

In some examples, estimating the residual noise may be based, at least in part, on the force data. According to some examples, estimating the residual noise may involve providing the fingerprint image data and noise data to a trained neural network implemented by the control system. In some examples, the noise data may correspond to a structure within, or proximate, the fingerprint sensor. According to some examples, the noise data may correspond to a structure within, or proximate, a particular area of the fingerprint sensor. In some examples, the structure may correspond to a patterned backer layer of, or proximate, the fingerprint sensor.

Other innovative aspects of the subject matter described in this disclosure may be implemented in an apparatus. The apparatus may include a fingerprint sensor and a control system. In some examples, at least a portion of the control system may be electrically connected to the fingerprint sensor. In some implementations, a mobile device may be, or may include, the apparatus. For example, a mobile device may include an apparatus as disclosed herein.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured to: receive fingerprint image data from the fingerprint sensor; obtain a first set of background image data; determine first processed fingerprint image data via a subtraction of the first set of background image data from the fingerprint image data; obtain force data corresponding to a force applied to the fingerprint sensor when the fingerprint image data were obtained; obtain a second set of background image data corresponding to the force; determine second processed fingerprint image data based, at least in part, on the first processed fingerprint image data and the second set of background image data; and output the second processed fingerprint image data.

According to some examples, determining the second processed fingerprint image data may involve a machine learning model. In some examples, determining the second processed fingerprint image data may involve providing the first processed fingerprint image data and the second set of background image data to a trained neural network implemented by the control system.

According to some examples, the fingerprint sensor may be, or may include, an ultrasonic fingerprint sensor. In some such examples, the control system may be further configured to: obtain multiple sets of fingerprint image data from the fingerprint sensor, each set of fingerprint image data corresponding to a different range gate delay; and determine the second processed fingerprint image data based, in part, on at least one set of fingerprint image data from the multiple sets of fingerprint image data.

In some examples, the control system may be further configured to estimate residual noise in the first set of background image data, the second set of background image data, or both.

According to some examples, the control system may be further configured to determine an additional set of processed fingerprint image data based, at least in part, on the first processed fingerprint image data and a residual noise estimate or on the second processed fingerprint image data and the residual noise estimate. In some examples, estimating the residual noise may be based, at least in part, on the force data. According to some examples, wherein estimating the residual noise may involve providing the fingerprint image data and noise data to a trained neural network implemented by the control system.

In some examples, the apparatus may include a backer layer proximate the fingerprint sensor and wherein the noise data may correspond to the backer layer. According to some examples, the backer layer may be a patterned backer layer. In some examples, the apparatus may include a stiffener layer. According to some examples, the apparatus may be a foldable mobile device.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon. For example, the software may include instructions for controlling one or more devices to perform one or more of the methods disclosed herein.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
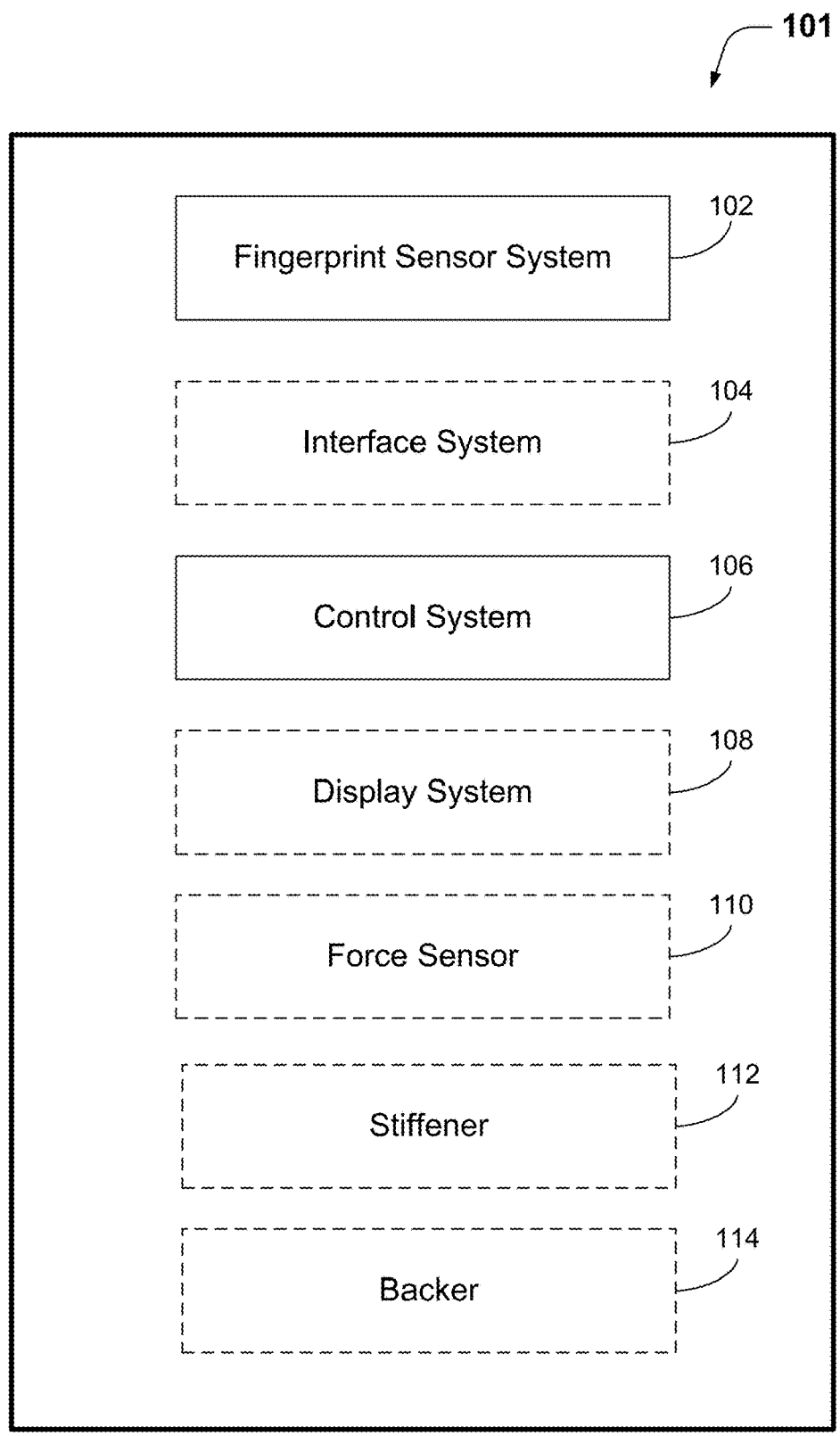
FIG. 1 is a block diagram that shows example components of an apparatus according to some disclosed implementations.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, automatic teller machines (ATMs), parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, automobile doors, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

As noted above, it can be challenging to obtain satisfactory fingerprint image data from a fingerprint sensor deployed in a flexible display device. (As used herein, the term "finger" can refer to any digit, including a thumb. Accordingly, the term "fingerprint" as used herein may refer to a print from any digit, including a thumb. Data received from a fingerprint sensor may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.)

A flexible display device may, for example, include a flexible organic light-emitting diode (OLED) display without a stable backer or a stable display cover glass. In order to improve device stability, a flexible display device may include a stiffener layer, such as a metal layer, which can cause additional challenges for obtaining satisfactory fingerprint image data. Some flexible display devices may include a flexible backer layer proximate the fingerprint sensor. In some instances, there may be an air gap between the flexible backer layer and the fingerprint sensor. The flexible backer layer may cause unexpected background patterns in the fingerprint image data, particularly when force is being applied due to a finger press, finger lift, device folding, device rolling, etc. Evaluating frequent changes of background images-obtained when a finger is not pressing on the fingerprint sensor-consumes a lot of power and computational resources, and can negatively affect fingerprint sensor reliability.

In some implementations, an apparatus may include a patterned flexible backer layer proximate the fingerprint sensor. In some instances, there may be an air gap between the patterned flexible backer layer and the fingerprint sensor. By monitoring the forces applied to the fingerprint sensor and the corresponding expected changes in background patterns in the fingerprint image data caused by the patterned flexible backer layer, a control system may filter out these background patterns by image processing, such as image reconstruction and denoising. Some examples may involve estimating residual noise based, at least in part, on received force data and a known pattern of the backing layer. In some examples, estimating the residual noise may involve providing fingerprint image data and noise data to a trained neural network implemented by the control system.

Particular implementations of the subject matter described in this disclosure may be implemented to realize one or more of the following potential advantages. According to some examples, fingerprint image quality may be enhanced by filtering out background patterns in the fingerprint image data caused by the patterned flexible backer layer when varying forces are applied to the fingerprint sensor. By monitoring the current finger force or the current finger pressure, in some examples a relatively higher level of fingerprint image quality may be obtained than without such force or pressure data. (Although force and pressure are different, in that pressure is force per unit of area, the terms "force" and "pressure" may sometimes be used interchangeably herein.) A higher level of fingerprint image quality can result in more accurate fingerprint scans, lower false rejection rates, and higher user satisfaction. Some disclosed examples may involve relatively fewer instances of obtaining background image data, as compared to previously-implemented methods of processing fingerprint image data obtained from flexible devices. Such implementations may cause relatively less power and fewer computational resources to be consumed, and may enhance fingerprint sensor longevity and reliability.

FIG. 1 is a block diagram that shows example components of an apparatus according to some disclosed implementations. As with other disclosed implementations, the types, number and arrangement of elements shown in FIG. 1 are merely presented by way of example. Other implementations may have other types, numbers and/or arrangements of elements. In this example, the apparatus 101 includes a fingerprint sensor system 102 and a control system 106. Some implementations of the apparatus 101 may include an interface system 104, a display system and/or a force sensor 110.

The fingerprint sensor system 102 may be any suitable type of fingerprint sensor system, such as an optical fingerprint sensor system, a capacitive fingerprint sensor system, a resistive fingerprint sensor system, a radio frequency-based fingerprint sensor system, etc. In some examples the fingerprint sensor system may be, or may include, an ultrasonic fingerprint sensor system. Some detailed examples are provided herein.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and a memory system, and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the fingerprint sensor system 102, between the control system 106 and the display system 108 (if present) and between the control system 106 and the force sensor 110 (if present). According to some such examples, the interface system 104 may couple at least a portion of the control system 106 to the fingerprint sensor system 102 (as well as the display system 108 and/or the force sensor 110, if present), e.g., via electrically conducting material such as conductive metal wires or traces.

According to some examples, the interface system 104 may be configured to provide communication between the apparatus 101 and other devices and/or human beings. In some such examples, the interface system 104 may include a user interface system having one or more user interfaces. The user interface system may, for example, include one or more loudspeakers, a touch and/or gesture sensor system, a haptic feedback system, etc. Although not shown as such in FIG. 1, the optional display system 108 may be considered to be part of the interface system 104.

The interface system 104 may, in some examples, include one or more network interfaces and/or one or more external device interfaces (such as one or more universal serial bus (USB) interfaces and/or a serial peripheral interface (SPI)). In some implementations, the apparatus 101 may include a memory system in addition to memory that the control system 106 may include. The interface system 104 may, in some examples, include at least one interface between the control system 106 and the memory system.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 may include a dedicated component for controlling the fingerprint sensor system 102 (as well as the display system 108 and/or the force sensor 110, if present). The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system is not shown in FIG. 1. In some implementations, functionality of the control system 106 may be partitioned between one or more controllers or processors, such as between a dedicated sensor controller and an applications processor of a mobile device. Some examples are described below.

The force sensor 110, if present in the apparatus 101, may be a piezo-resistive sensor, a capacitive sensor, a thin film sensor (e.g., a polymer-based thin film sensor), or another type of suitable force sensor. If the force sensor 110 includes a piezo-resistive sensor, the piezo-resistive sensor may include silicon, metal, polysilicon and/or glass. The fingerprint sensor system 102 and the force sensor 110 may, in some instances, be mechanically coupled. In some such examples, the force sensor 110 may be integrated into circuitry of the fingerprint sensor system 102. Some examples are disclosed herein. However, in other implementations the force sensor 110 may be separate from the fingerprint sensor system 102. The fingerprint sensor system 102 and the force sensor 110 may, in some examples, be indirectly coupled. For example, the fingerprint sensor system 102 and the force sensor 110 each may be coupled to a portion of the apparatus 101. In some such examples, the fingerprint sensor system 102 and the force sensor 110 each may be coupled to a portion of the control system.

However, some implementations may not include a force sensor 110 that is separate from the fingerprint sensor system 102. In some such examples, the control system 106 may be configured for force detection and/or pressure detection based, at least in part, on fingerprint sensor data from the fingerprint sensor system 102.

In some implementations, the apparatus may include a display stack that includes the display system 108. According to some examples, the display stack may be a foldable display stack that includes a stiffener 112 and display stack layers. The stiffener 112, when present, may have a relatively high acoustic impedance, e.g., an acoustic impedance of 10 MRayls or more. In some implementations, the stiffener 112 may be, or may include, a metal layer (e.g., a stainless steel layer having an acoustic impedance of approximately 47 MRayls). The display stack layers may, in some examples, include layers of a light-emitting diode (LED) display, such as an organic light-emitting diode (OLED) display. Some examples of display stack layers are provided in this disclosure.

In some examples, the apparatus 101 may include a backer 114, which also may be referred to herein as a backer layer 114. According to some examples, the backer layer 114 may have a pattern on one or more surfaces. For example the backer layer 114 may have a pattern on a surface that is proximate a fingerprint sensor of the fingerprint sensor system 102. The pattern of the backer layer 114 may be "known" by the control system 106. In other words, backer layer pattern data that indicates, or corresponds to, the pattern of the backer layer 114 may be stored in a data structure of a memory that is accessible by the control system 106. In some instances, the backer layer 114 may be described as being a part of a fingerprint sensor stack and/or as part of the fingerprint sensor system 102.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone). The interface system 104 also may, in some such examples, reside in more than one device.

Figure 2B:
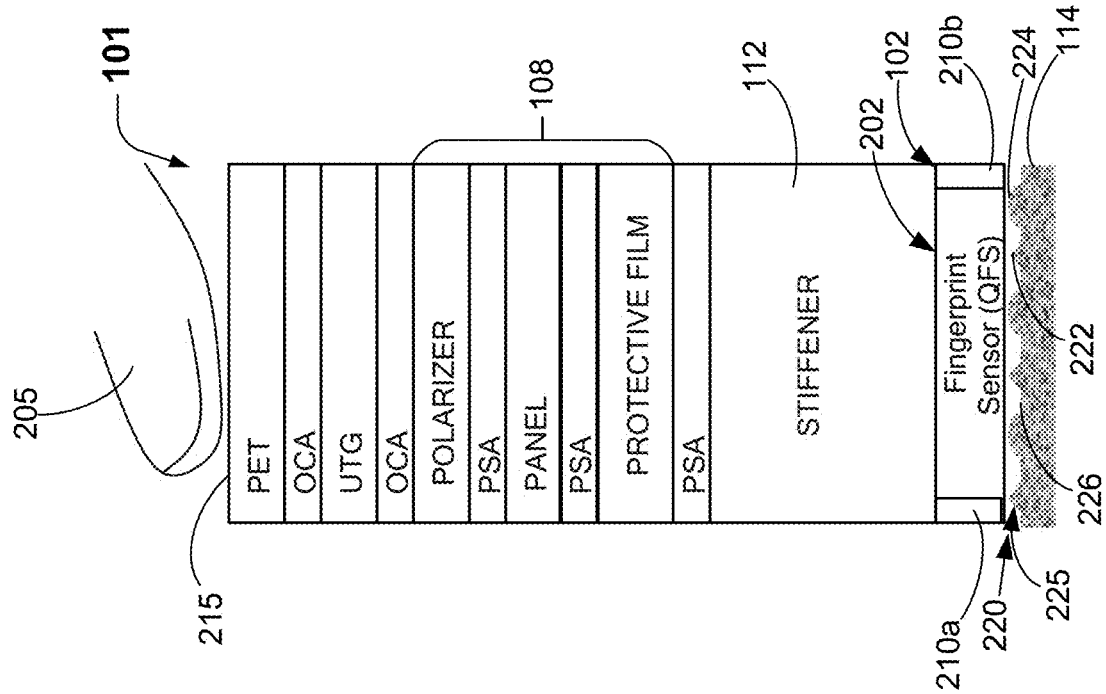
FIGS. 2A and 2B show examples of cross-sections through portions of one implementation of the apparatus of FIG. 1.
Figure 2A:
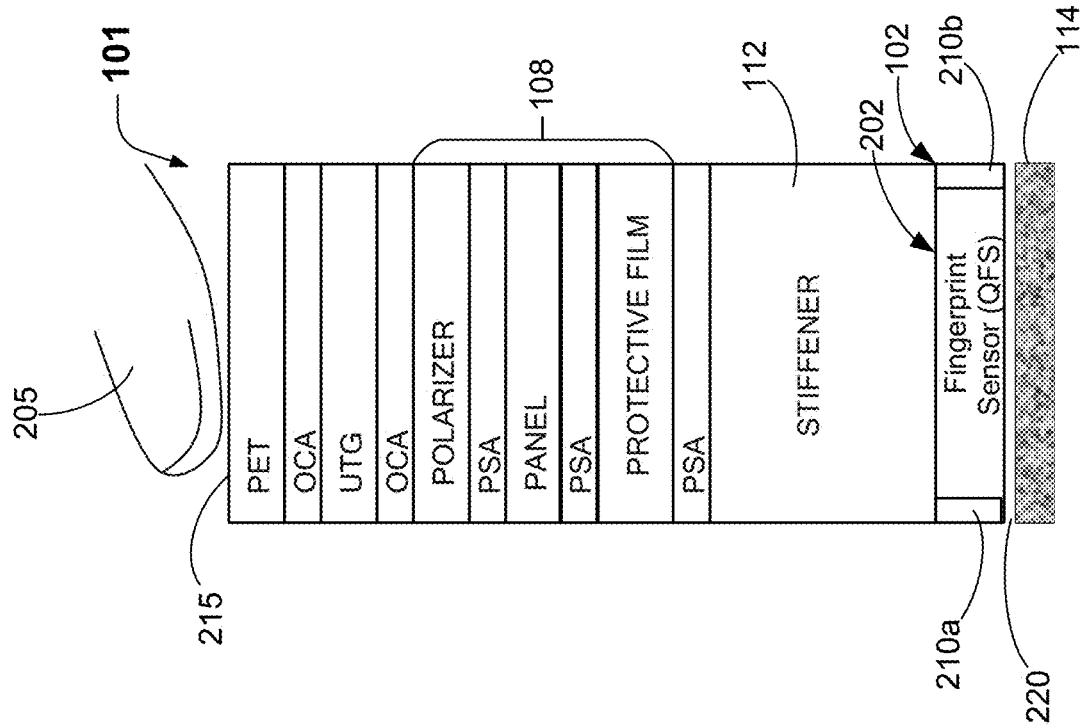

FIGS. 2A and 2B show examples of cross-sections through portions of one implementation of the apparatus of FIG. 1. As with other disclosed implementations, the types of elements, the numbers of elements, the arrangements of elements, etc., shown in FIGS. 2A and 2B are merely shown by way of example. Other implementations may include different types, numbers and/or arrangements of elements.

In these examples, a finger 205 is shown touching an outer surface 215 of the apparatus 101, which is the outer surface of a layer of polyethylene terephthalate (PET) in this example. According to these examples, layers of optically clear adhesive (OCA) bind a layer of ultra-thin glass (UTG) to the PET layer and to a polarizer layer of a display system 108. Here, the layers of the display system 108 also include a display panel and a protective film layer, all of which are bonded together by pressure-sensitive adhesive in this example. According to these examples, the display system 108 is bonded to a stiffener layer 112 by another layer of PSA. The stiffener layer 112 and the display system 108 may be considered to be part of a display stack, in part because the stiffener helps to provide structural integrity to the display system 108.

In these examples, the fingerprint sensor system 102 includes a fingerprint sensor 202 and force sensing portions 210a and 210b. Accordingly, in these examples the fingerprint sensor system 102 is configured for both force sensing and fingerprint acquisition. More detailed examples of fingerprint sensor systems configured for both force sensing and fingerprint acquisition are described below with reference to FIGS. 17A-17D. In some alternative examples, the apparatus may include a force sensor 110 that is separate from the fingerprint sensor system 102.

According to these examples, the apparatus 101 includes a backer layer 114 that is separated from the fingerprint sensor 202 and the force sensing portions 210a and 210b by an air gap 220. In these examples, the backer layer 114 is flexible. In some examples, the backer layer 114 may include foam, such as polystyrene foam, expanded polystyrene (EPS) foam, or a similar material. In the example shown in FIG. 2B, the backer layer 114 has a patterned surface 225 that is adjacent the fingerprint sensor 202 and the force sensing portions 210a and 210b: here, the patterned surface 225 includes angular protuberances 222 and rounded protuberances 224, which are separated by flat portions 226. In other examples, the patterned surface 225 may include other shapes, other patterns, or both. In some examples, backer layer pattern data that indicates, or corresponds to, the pattern of the patterned surface 225 may be stored in a data structure of a memory that is accessible by the control system 106 (not shown). For example, the backer layer pattern data may include information regarding the locations of the angular protuberances 222 and the rounded protuberances 224, information regarding the dimensions of the angular protuberances 222 and the rounded protuberances 224, etc.

Figure 3:
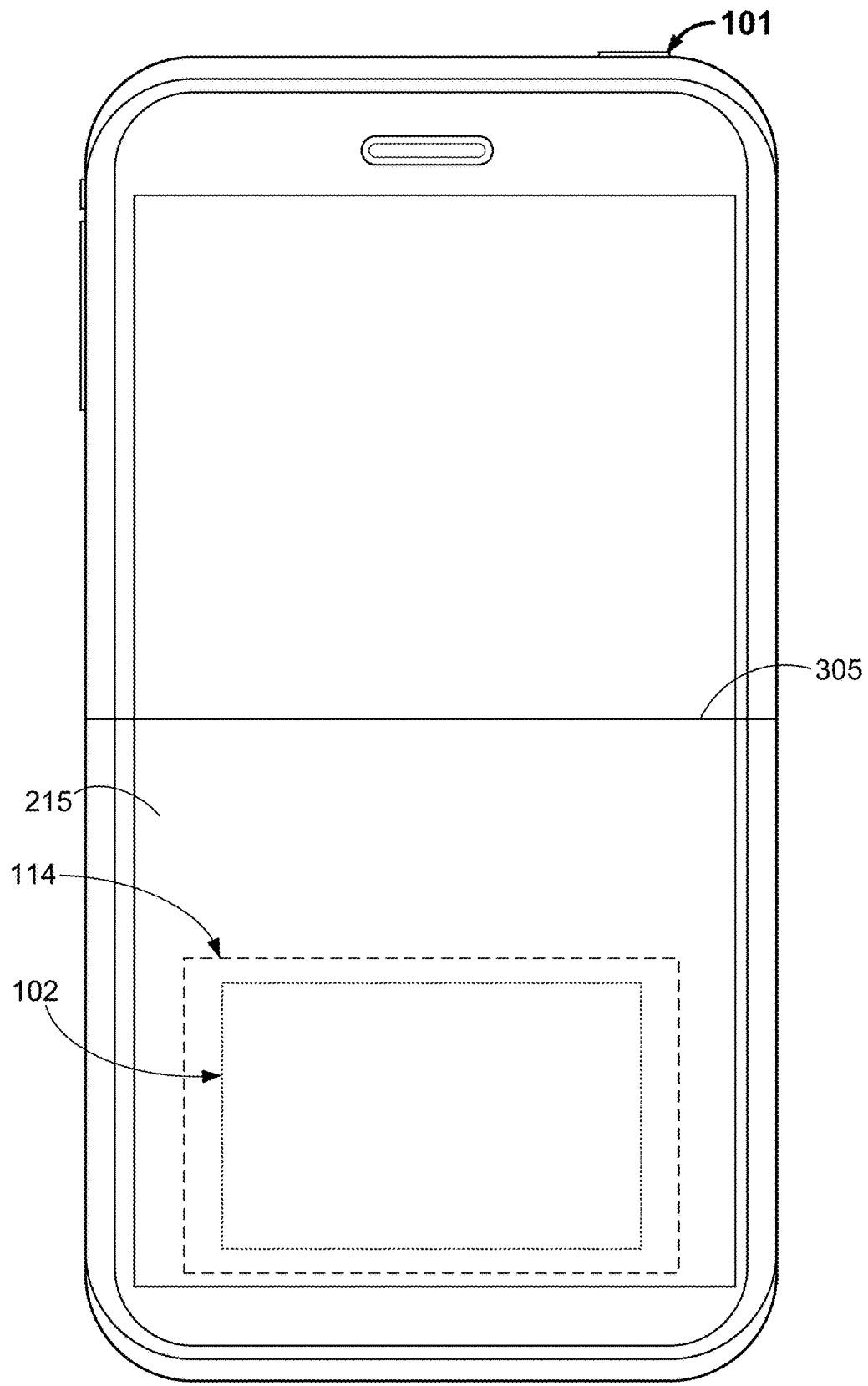
FIG. 3 shows an example of a foldable display implementation.

FIG. 3 shows an example of a foldable display implementation. According to this example, the apparatus 101 is foldable along the hinge area 305. In this example, instances of the fingerprint sensor system 102 and the backer layer 114 of FIG. 2B are shown with dashed outlines, indicating that they are within the apparatus 101. In this example, the stiffener 112, elements of the display system 108, etc., of FIG. 2B reside between the outer surface 215, the fingerprint sensor system 102 and the backer layer 114. According to this example, the backer layer 114 extends across a larger area than the area occupied by the fingerprint sensor system 102.

Figure 4:
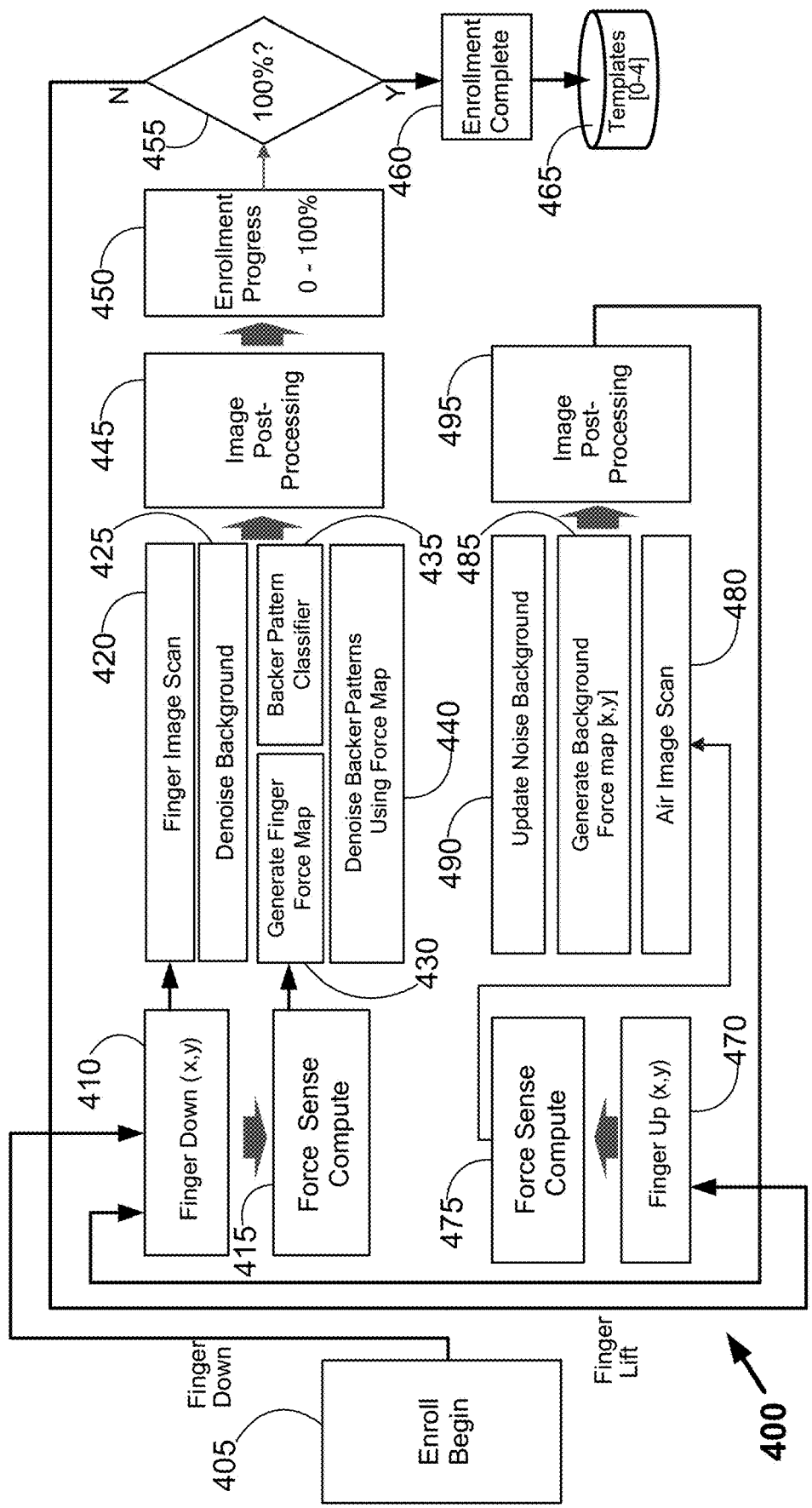
FIG. 4 is a flow diagram that indicates blocks of an enrollment process according to one example.

FIG. 4 is a flow diagram that indicates blocks of an enrollment process according to one example. The blocks of FIG. 4 may, for example, be performed (at least in part) by the control system 106 of FIG. 1. As with other methods disclosed herein, the method 400 outlined in FIG. 4 may include more or fewer blocks than indicated. Moreover, the blocks of methods disclosed herein are not necessarily performed in the order indicated. In some examples, some blocks of methods disclosed herein may be performed concurrently.

In this example, the enrollment process begins with block 405. Block 405 may, for example, involve presenting one or more graphical user interfaces (GUIs) corresponding to the enrollment process on a display device, receiving user input, etc. Block 405 may, for example, involve presenting one or more GUIs prompting a user to initiate the enrollment process and receiving user input confirming that the user is ready and willing to engage in the enrollment process. Block 405 may, for example, involve presenting a GUI prompting a user to place one or more fingers on a fingerprint sensor area indicated on a display device. This corresponds to the "finger down" text between block 405 and block 410.

For the sake of simplicity, the following discussion will involve blocks of a process of enrolling individual fingers. Alternative examples may involve enrolling multiple fingers at the same time.

In this example, block 410 involves detecting a finger press event on a fingerprint sensor area of the fingerprint sensor system 102 and determining the area of the finger press. According to this example, block 415 involves receiving force sensor data from a force sensor corresponding to the finger press. In some examples the force sensor may be part of the fingerprint sensor system 102, whereas in other examples force sensor may be separate from the fingerprint sensor system 102.

According to this example, block 420 involves scanning the finger on the fingerprint sensor area and obtaining fingerprint image data from the finger. In some examples, block 415 and 420 may be performed at the same time, or substantially at the same time. In this example, block 425 involves denoising the fingerprint image data obtained in block 420. Block 425 may, for example, involve subtracting background or "air" image data from the fingerprint image data. The background image data will generally have been obtained when no finger or other object was on, or proximate, the fingerprint sensor area.

In this example, block 430 involves generating a finger force map. The finger force map may, for example, be generated based on the force data obtained in block 415 and the area of the finger press, the latter of which may be determined in block 410 and/or block 415. In some examples, the finger force map may simply indicate an average finger force over the area of the finger press. In other examples, the finger force map indicate varying forces over the area of the finger press, such as an area of highest finger force and one or more surrounding areas having lower finger forces.

According to this example, block 435 involves classifying the backer pattern. In this example, block 435 involves classifying the backer pattern based, at least in part, on the area of the finger press and/or the finger force map generated in block 430. For example, block 435 may involve determining an area of a backer pattern that corresponds with the area of the finger press. Block 435 may, for example, involve searching or querying a data structure of a memory in which backer layer pattern data is stored. The backer layer pattern data may indicate, or correspond to, a pattern of a backer layer on a surface that is proximate the fingerprint sensor system 102.

In this example, block 440 involves denoising one or more backer patterns in the denoised fingerprint image data output by block 425 based, at least in part, on the finger force map generated in block 430 and the backer pattern classification of block 435. The backer patterns may be regarded as a type of noise and may sometimes be referred to herein as noise data, or as a type of noise data. In some examples, block 435 may involve searching or querying a data structure of a memory in which finger forces and corresponding backer patterns in the fingerprint image data are stored. According to some examples, a data structure that includes finger forces and corresponding backer patterns in the fingerprint image data may be obtained, at least in part, during a factory calibration process. In some examples, a data structure that includes finger forces and corresponding backer patterns in the fingerprint image data may be obtained, at least in part, during an enrollment process such as the enrollment process of FIG. 4. According to some examples, a data structure may include finger forces, corresponding backer patterns in the fingerprint image data and temperature. This may be advantageous because the material properties of the backer layer may vary according to temperature. In some examples, block 435 may be performed by a trained neural network implemented by the control system.

According to this example, block 445 involves image post-processing for additional image enhancement. In this example, the image post-processing of block 445 is performed on the output of block 440, after the denoising of backer patterns using the force map. In some examples, the image post-processing of block 445 may involve wavelet-based denoising, filter-based denoising, multi-image fusion, fingerprint feature detection and enhancement, or combinations thereof.

In this example, blocks 450 and 455 involve determining whether the enrollment process is complete. Block 450 may, for example, involve storing a currently-obtained fingerprint template and determining whether the enrollment process is complete for a particular finger and block 455 may involve determining whether the entire enrollment process is complete. In some examples, block 450 or block 455 may involve determine whether additional finger force data will be acquired for a particular finger. If the process is complete (block 460), enrollment data—which may include but may not be limited to fingerprint data templates—may be stored in block 465. In some implementations, block 460 may involve extracting fingerprint features, such as fingerprint minutiae, from fingerprint image data obtained during the enrollment process. However, if it is determined in block 455 that the enrollment process is not complete, the process continues to "finger up" block 470. Between block 455 and block 470, in some examples a user prompt may be provided for the user to lift the finger that is currently being enrolled.

In this example, block 470 involves a "finger up" determination. In other words, block 470 involves determining when a finger that has been involved in the enrollment process 400 has been lifted—or is being lifted—from a fingerprint sensor area. In some instances, the finger may be lifted in response to a user prompt, which may include a GUI, provided by the apparatus 101. According to this example, block 475 involves obtaining finger force data from a force sensor corresponding to the "finger up" event. In some examples, block 475 may involve obtaining a single finger force, whereas in other examples, block 475 may involve obtaining a plurality of—in other words, two or more—finger force data measurements while a finger is being lifted from the fingerprint sensor area.

According to this example, block 480 involves obtaining one or more air images, also referred to herein as a background images, via the fingerprint sensor system 102. The one or more background images will generally be obtained when no finger is touching the fingerprint sensor area, in this example after a finger has been fully lifted from the fingerprint sensor area.

In this example, block 485 involves generating a background force map. In this example, the finger has already been lifted from the fingerprint sensor area, so there is currently no finger force. Accordingly, block 485 may involve generating a force map based on one or more finger forces measured during the "finger up" event. For a time interval after a finger has been lifted from the fingerprint sensor area, there may still be residual deformation of the fingerprint sensor area, the backer, etc., particularly in the area in which finger force had just recently been applied. In some examples, block 485 may involve generating multiple force maps based on each of a plurality of finger forces obtained in block 475.

According to this example, block 490 involves updating the current background image data according to the one or more air images obtained in block 480. In some examples, block 490 may involve updating a background image data structure to include background image data corresponding to the one or more air images obtained in block 480 and storing the updated background image data structure in a memory. In this example, block 495 involves image post-processing. Block 495 may, for example, involve filtering, fusion, etc. In this example, after block 495 the flow proceeds to the "finger down" block 410. Between block 495 and block 410, in some examples a user prompt may be provided for the user to place a finger on a fingerprint sensor area.

Figure 5:
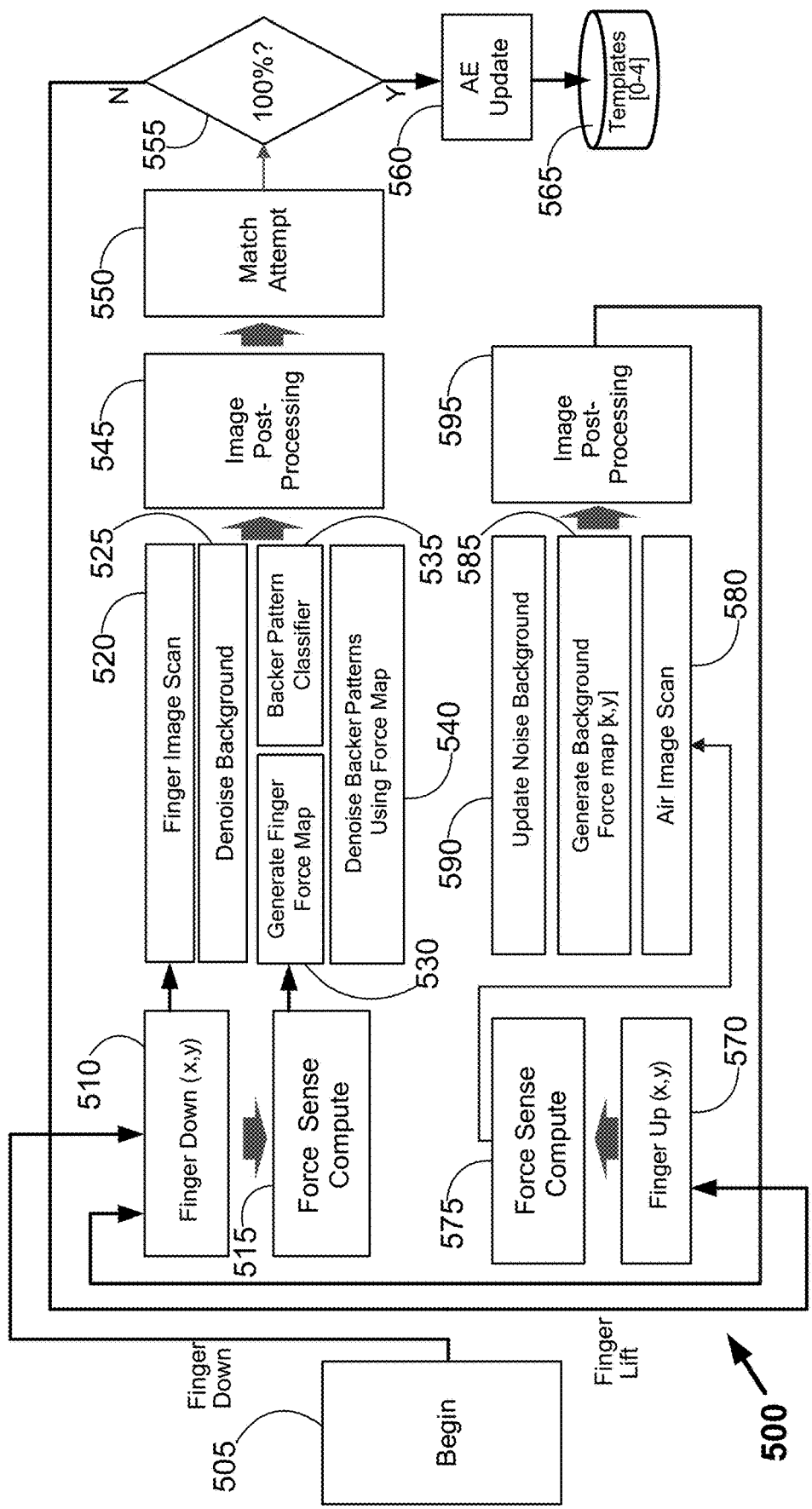
FIG. 5 is a flow diagram that indicates blocks of a fingerprint authentication process according to one example.

FIG. 5 is a flow diagram that indicates blocks of a fingerprint authentication process according to one example. The blocks of FIG. 5 may, for example, be performed (at least in part) by the control system 106 of FIG. 1. As with other methods disclosed herein, the method 500 may include more or fewer blocks than indicated. Moreover, the blocks of methods disclosed herein are not necessarily performed in the order indicated. In some examples, some blocks of methods disclosed herein may be performed concurrently.

In this example, the fingerprint authentication process begins with block 505. Block 505 may, for example, involve presenting one or more graphical user interfaces (GUIs) corresponding to the fingerprint authentication process on a display device, receiving user input, etc. Block 505 may, for example, involve presenting one or more GUIs prompting a user to initiate the fingerprint authentication. Block 505 may, for example, involve presenting a GUI prompting a user to place one or more fingers on a fingerprint sensor area indicated on a display device. This corresponds to the "finger down" branch after block 505. For the sake of simplicity, the following discussion will involve blocks of a fingerprint authentication process involving an individual finger. Alternative fingerprint authentication examples may involve multiple fingers.

In these examples, blocks 510-545 and 575-595 may correspond to blocks 410-445 and 475-495 of FIG. 4 and may be performed as described above. However, in this example block 550 involves attempting to match fingerprint features extracted from currently-obtained fingerprint image data with fingerprint features extracted from fingerprint image data obtained during a fingerprint enrollment process. According to this example, block 555 involves determining whether the match attempt of block 550 was successful. If so, access to the apparatus may be provided. In this example, if it is determined in block 555 that the match attempt of block 550 was successful, one or more data structures of previously-obtained fingerprint features are updated in block 560 and stored in block 565.

In this example, if it is determined in block 555 that the match attempt of block 550 was not successful, method 500 may involve providing a user with one or more additional fingerprint authentication attempts. In some examples, method 500 may involve providing user prompts, such as via one or more GUIs, for the user to lift the finger from a fingerprint sensor area, place the finger in the fingerprint sensor area, place another finger in the fingerprint sensor area, or take some other action.

Figure 6:
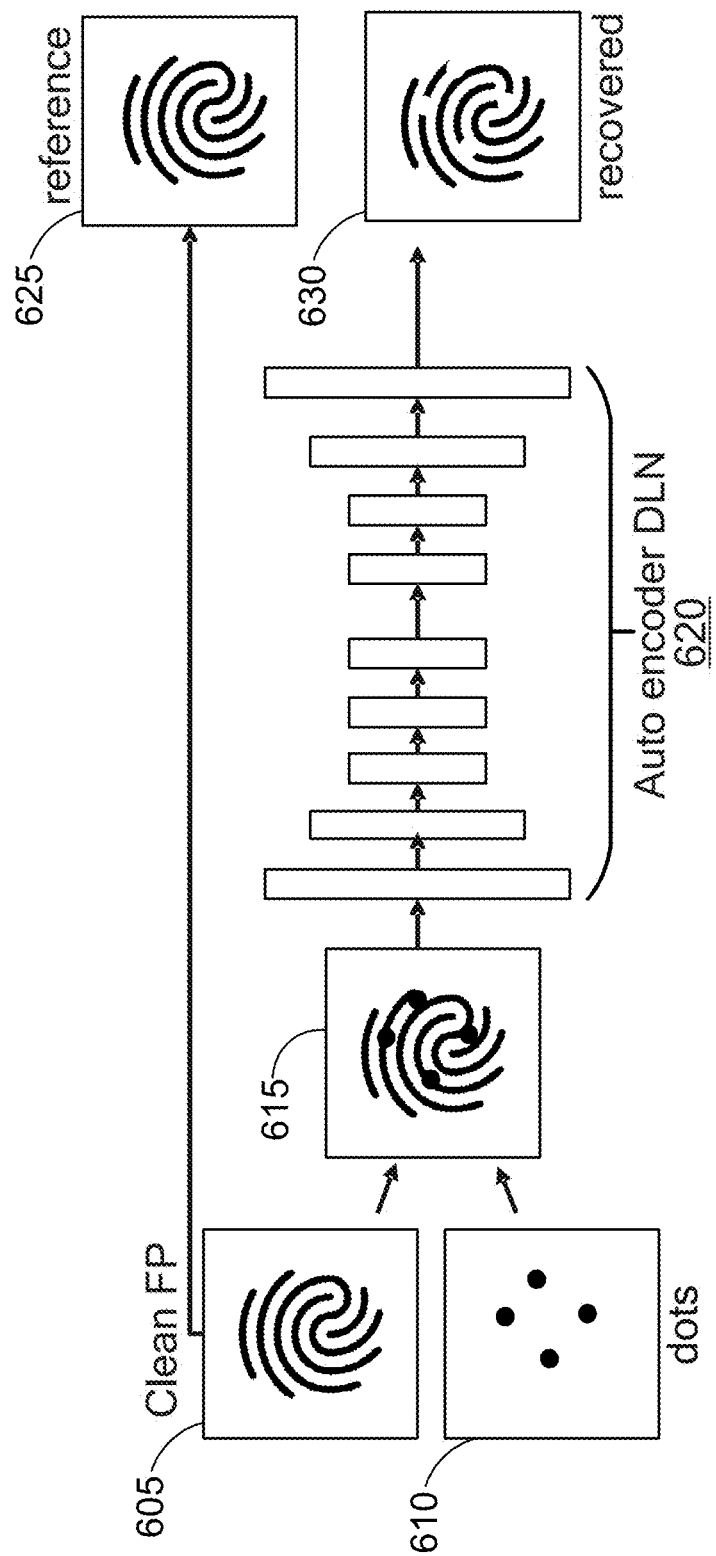
FIG. 6 shows blocks involved in training a neural network to remove backer patterns in fingerprint image data according to one example.

FIG. 6 shows blocks involved in training a neural network to remove backer patterns in fingerprint image data according to one example. In this example, clean fingerprint image data 605 and reference fingerprint image data 625 of FIG. 6 represent fingerprint image data corresponding to a fingerprint image that does not include noise corresponding to a backer pattern. According to this example, dots 610 are added to the clean fingerprint image data 605, to produce input fingerprint image data 615 that is provided to the neural network 620. The dots 610 may, for example, correspond to a backer pattern caused by a particular portion of a backer layer 114. The dots 610 may, in some examples, correspond to a backer pattern caused by a particular portion of a backer layer 114 when a particular force, or range of forces, is applied to an area of the fingerprint sensor. In this example, the neural network 620 is an auto encoder deep learning network. Other implementations may involve other types of neural networks—such as U-Net or ResNet, for example—more layers, fewer layers, etc.

In this example, the recovered data 630 produced by the neural network 620 is compared to the reference fingerprint image data 625. The neural network 620 is updated according to differences between the reference fingerprint image data 625 and the recovered data 630. The neural network 620 may, for example, be trained until convergence. Convergence may, for example, be attained when one or more differences between the reference fingerprint image data 625 and the recovered data 630 are less than a threshold. In some examples, the neural network 620 may be trained until convergence is attained using dots 610 corresponding to each force of a plurality of forces, or corresponding to each force range of a plurality of force ranges. According to some examples, the neural network 620 may be trained until convergence is attained using dots 610 corresponding to each area of a plurality of areas of the fingerprint sensor system 102 and/or the backer layer 114.

Figure 7B:
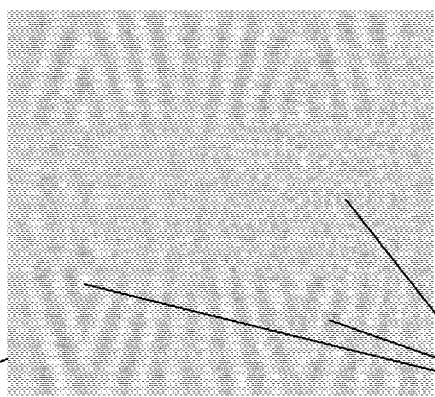
FIGS. 7A and 7B show examples of image data obtained from the fingerprint sensor system 102 corresponding to different forces applied on a test pattern.
Figure 7A:
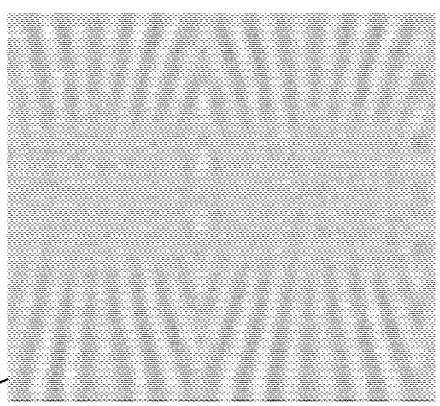

FIGS. 7A and 7B show examples of image data obtained from the fingerprint sensor system 102 corresponding to different areas of a test pattern. In both examples, the apparatus 101 included a backer layer 114 having a patterned surface proximate the fingerprint sensor system 102. The example shown in FIG. 7A is an image obtained when no force was applied to the fingerprint sensor system 102. The example shown in FIG. 7B is an image obtained when a 300 gram-force was applied to the fingerprint sensor system 102. In FIG. 7B, one may observe numerous artifacts 705 caused by the patterned surface of the backer layer 114 when the 300 gram-force was applied.

Figure 8:
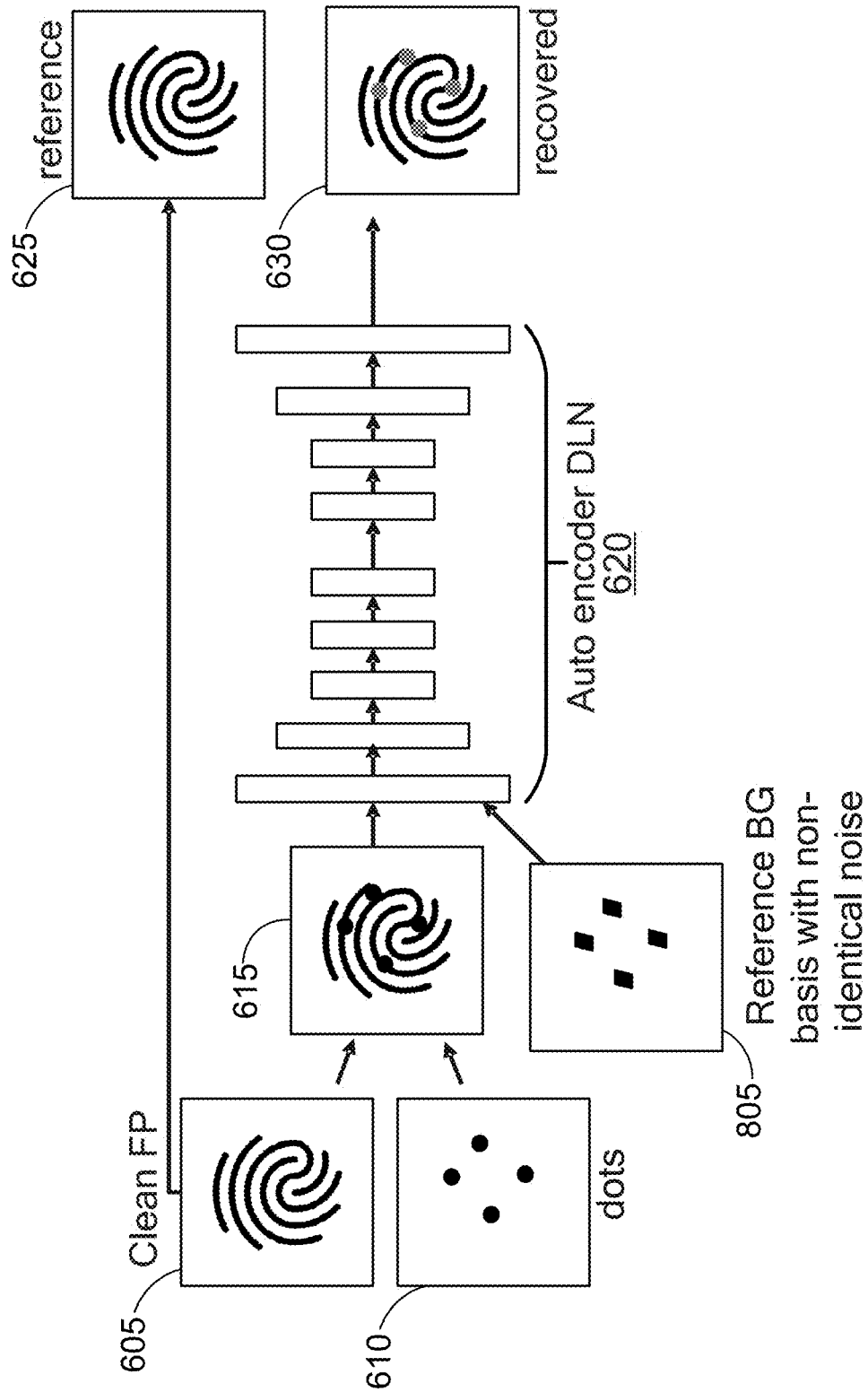
FIG. 8 shows another example of training a neural network to remove backer patterns in fingerprint image data.

FIG. 8 shows another example of training a neural network to remove backer patterns in fingerprint image data. In this example, as in FIG. 6, clean fingerprint image data 605 and reference fingerprint image data 625 represent fingerprint image data corresponding to a fingerprint image that does not include noise corresponding to a backer pattern, and the dots 610 are added to the clean fingerprint image data 605, to produce input fingerprint image data 615 that is provided to the neural network 620. The comments above regarding the elements of FIG. 6 apply equally to the corresponding elements of FIG. 8.

The example of FIG. 8 differs from that of FIG. 6 because FIG. 8 includes adding non-identical noise 805. According to this example, the non-identical noise 805 is similar to, but not the same as, the dots 610. In this example, the non-identical noise 805 includes parallelogram shapes in positions that are correspond to the dot positions of the dots 610. In other examples, the non-identical noise 805 may include shapes other than parallelogram shapes, such as square shapes, triangular shapes, oval shapes, star shapes, etc. In some alternative examples, the positions of the non-identical noise 805 may not correspond exactly to the dot positions of the dots 610. According to some examples, the dots 610 may correspond to artifacts produced by the backer layer 114 when a first force is applied to the fingerprint sensor system 102 and the non-identical noise 805 may correspond to artifacts produced by the backer layer 114 when a second force is applied to the fingerprint sensor system 102. Here, the non-identical noise 805 is separately provided to the neural network 620. In some alternative examples, the non-identical noise 805 may be added to the input fingerprint image data 615.

Figure 9:
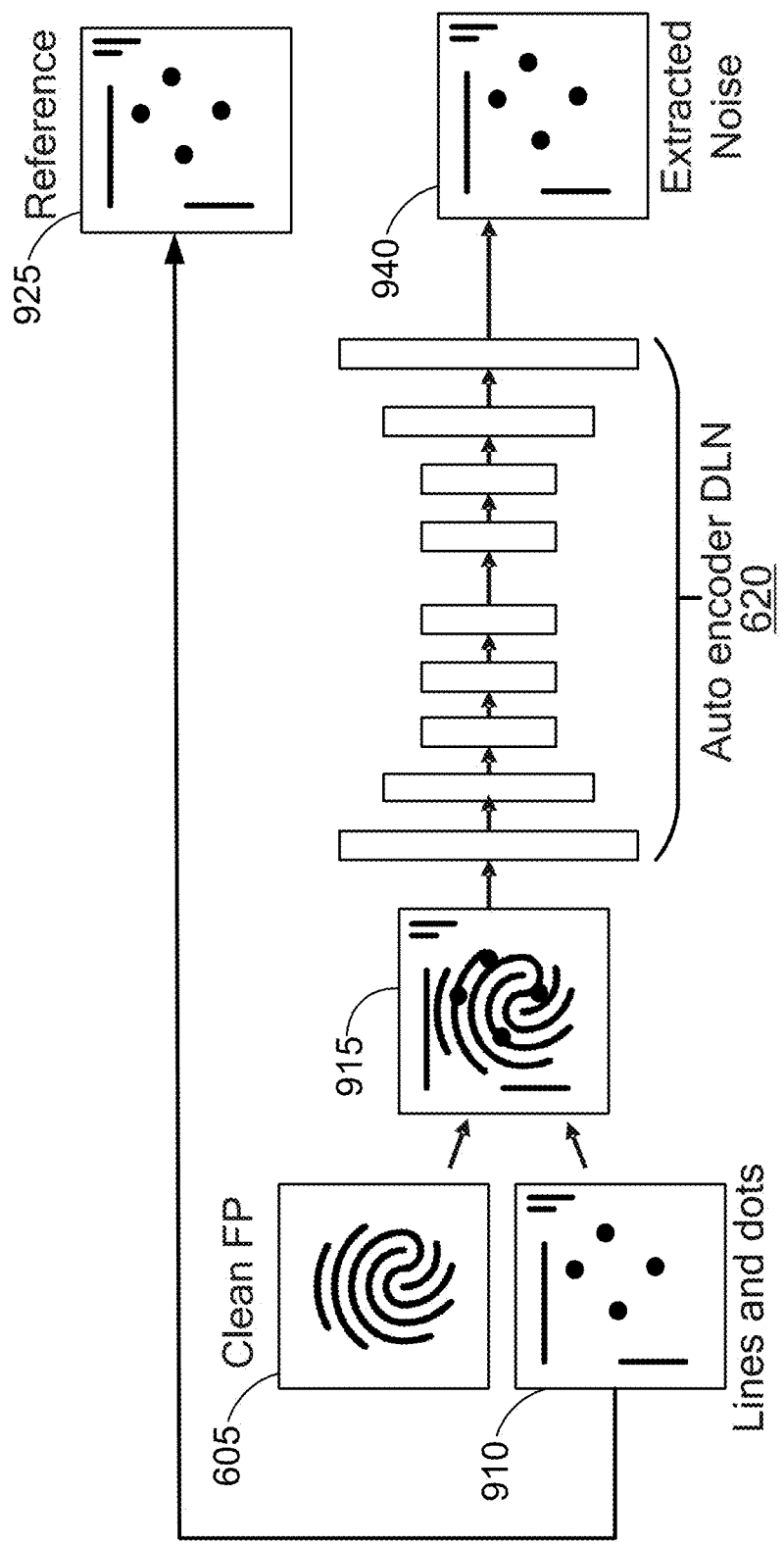
FIG. 9 shows an example of training a neural network to extract noise from fingerprint image data.

FIG. 9 shows an example of training a neural network to extract noise from fingerprint image data. In this example, clean fingerprint image data 605 does not include noise corresponding to a backer pattern. According to this example, dots and lines 910 are added to the clean fingerprint image data 605, to produce input fingerprint image data 915 that is provided to the neural network 620. The dots and lines 910 may, for example, correspond to a backer pattern caused by a particular portion of a backer layer 114. The dots and lines 910 may, in some examples, correspond to a backer pattern caused by a particular portion of a backer layer 114 when a particular force, or range of forces, is applied to an area of the fingerprint sensor. In this example, the neural network 620 is an auto encoder deep learning network. Other implementations may involve other types of neural networks, more layers, fewer layers, etc.

Unlike the examples described above with reference to FIGS. 6 and 8, in the example shown in FIG. 9 the reference data 925 corresponds to the dots and lines 910. Therefore, instead of training the neural network 620 to produce a cleaner fingerprint image, in FIG. 9 the neural network 620 is trained to produce extracted noise 940 that is similar to the dots and lines of the reference data 925.

Figure 10:
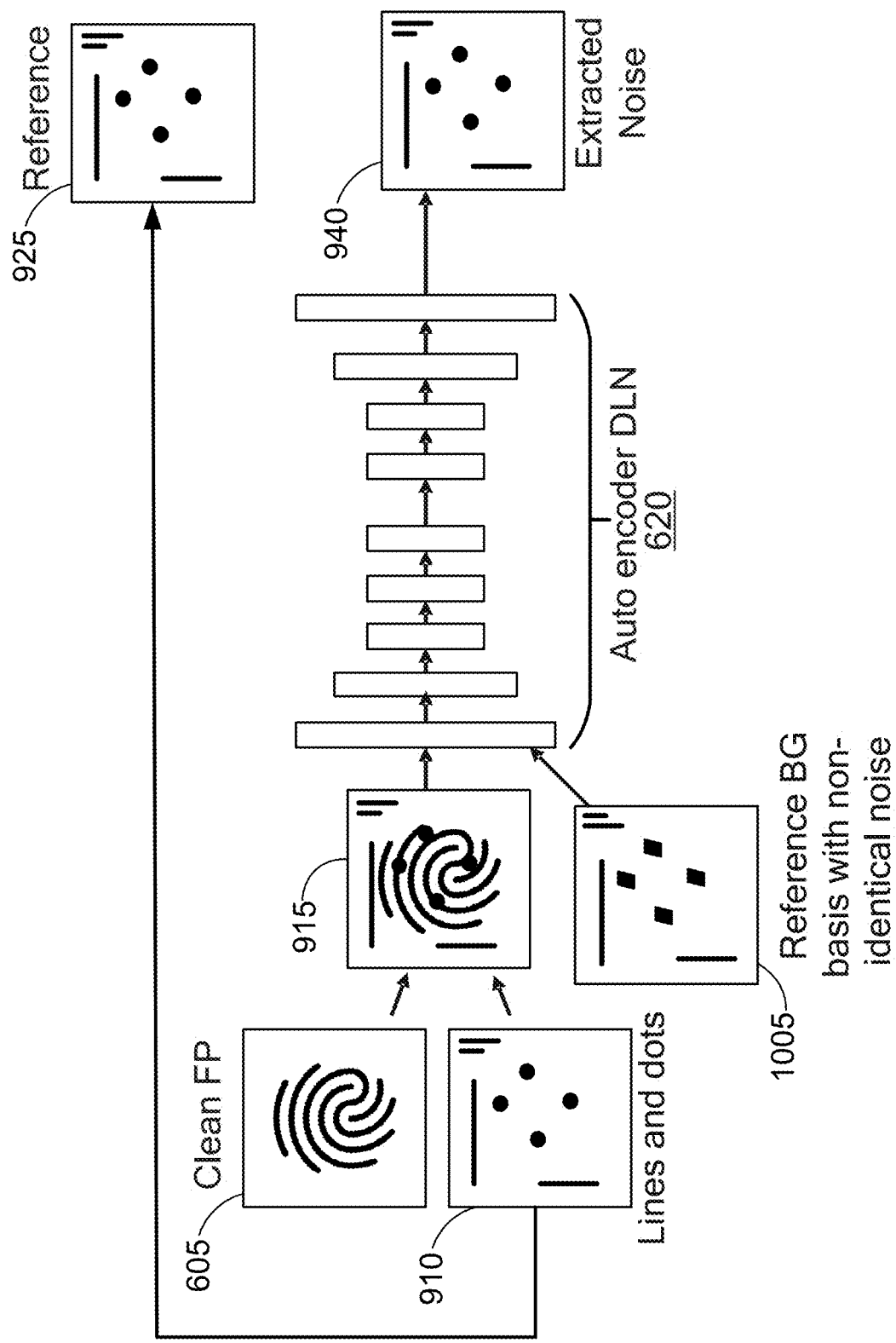
FIG. 10 shows another example of training a neural network to extract noise from fingerprint image data.

FIG. 10 shows another example of training a neural network to extract noise from fingerprint image data. In this example, as in FIG. 9, dots and lines 910 are added to the clean fingerprint image data 605, to produce input fingerprint image data 915 that is provided to the neural network 620. The reference data 925 corresponds to the dots and lines 910. The comments above regarding the elements of FIG. 9 apply equally to the corresponding elements of FIG. 10.

The example of FIG. 10 differs from that of FIG. 9 because FIG. 10 includes adding non-identical noise 1005. According to this example, the non-identical noise 1005 is similar to, but not the same as, the dots and lines 910. In this example, the non-identical noise 1005 includes parallelogram shapes in positions that are correspond to the dot positions of the dots and lines 910. In other examples, the non-identical noise 1005 may include shapes other than parallelogram shapes, such as square shapes, triangular shapes, oval shapes, star shapes, etc. According to this example, the non-identical noise 1005 also includes slightly different lines than those of the dots and lines 910. For example, in the upper right corner of the non-identical noise 1005 there are two lines and the line to the right is shorter than the line to the left. In the upper right corner of the dots and lines 910 there are also two lines. However, the line to the right is longer than the line to the left. Here, the non-identical noise 1005 is separately provided to the neural network 620. In some alternative examples, the non-identical noise 1005 may be added to the input fingerprint image data 915.

Figure 11:
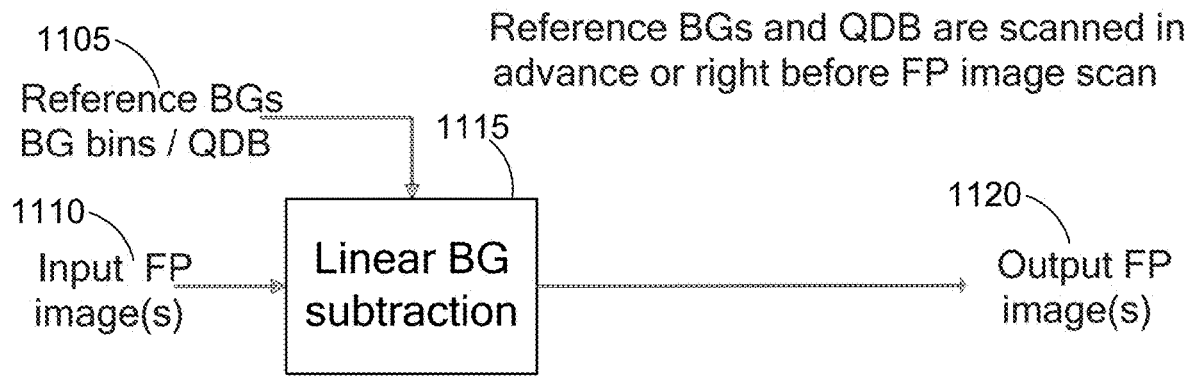
FIG. 11 depicts a conventional process of subtracting background image data from fingerprint image data.
Figure 12:
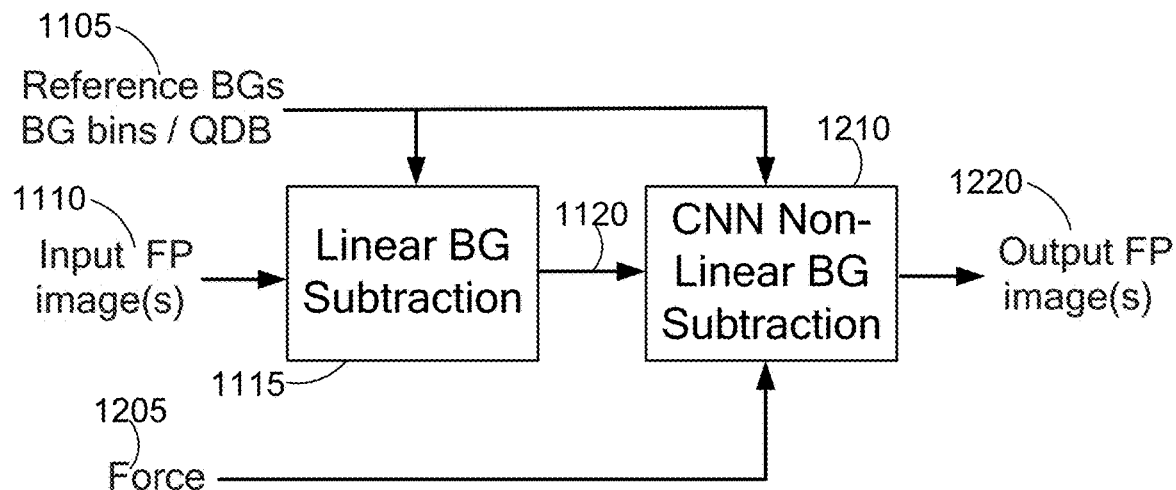
FIG. 12 depicts an example of a currently-disclosed process of removing background image data from fingerprint image data.
Figure 13:
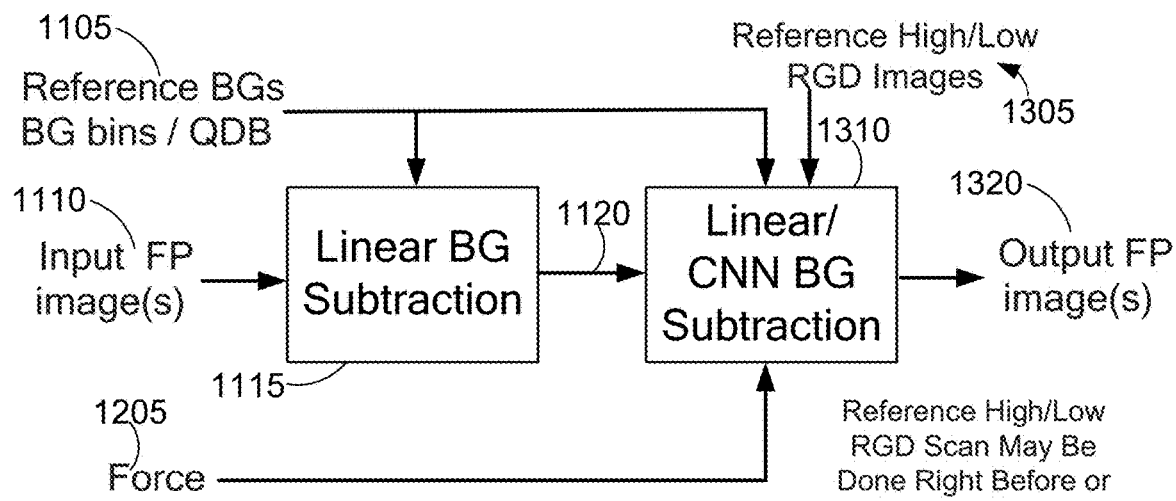
FIG. 13 depicts another currently-disclosed process of removing background image data from fingerprint image data.

FIG. 11 depicts a conventional process of subtracting background image data from fingerprint image data. The linear background subtraction module 1115 may, for example, be implemented by a control system according to instructions stored on one or more computer-readable media. In this example, the linear background subtraction module 1115 receives fingerprint image data 1110 and background image data 1105, and is configured to subtract the background image data 1105 from the fingerprint image data 1110 according to a linear subtraction process and to produce output fingerprint data 1120. In FIGS. 11-13, "BG" represents background image data and "BG bins" are background images corresponding to temperature. The BG bins may, for example, be obtained at multiple temperatures. Some implementations may involve interpolating between BG images obtained at intermediate temperatures, in order to generate estimates of BG images for an entire temperature range. The temperature range may include all of the temperatures at which a device including a disclosed implementation, such as a cell phone, may be used. In FIGS. 11-13, "QDB" stands for "quick dynamic background." In some examples, a QDB image may be an additional background or air image that is obtained when the noise in the air reaches a threshold level. Accordingly, a QDB is generally a BG from a very recent time.

FIG. 12 depicts an example of a currently-disclosed process of removing background image data from fingerprint image data. The linear background subtraction module 1115 and the non-linear background subtraction module 1210 may, for example, be implemented by the control system 106 of FIG. 1 according to instructions stored on one or more computer-readable media. The linear background subtraction module 1115 shown in FIGS. 12-15B is optional. Accordingly, some alternative implementations of the processes shown in FIGS. 12-15 may not include the linear background subtraction module 1115.

According to this example, the non-linear background subtraction module 1210 is, or includes, a neural network that is implemented by the control system. In this example, the neural network is a convolutional neural network (CNN), but in other examples the neural network may be another type of neural network. In some examples, the neural network may be trained as described herein, for example with reference to one or more of FIGS. 6-10.

In this example, the linear background subtraction module 1115 receives fingerprint image data 1110 and background image data 1105, and is configured to subtract the background image data 1105 from the fingerprint image data 1110 according to a linear subtraction process and to provide output fingerprint data 1120 to the non-linear background subtraction module 1210. According to this example, a CNN corresponding the non-linear background subtraction module 1210 is configured to receive the output fingerprint data 1120 and the force data 1205 as input and to produce the output fingerprint data 1220.

FIG. 13 depicts another currently-disclosed process of removing background image data from fingerprint image data. The linear background subtraction module 1115 and the linear/CNN background subtraction module 1310 may, for example, be implemented by the control system 106 of FIG. 1 according to instructions stored on one or more computer-readable media. According to this example, the linear/CNN background subtraction module 1310 is, or includes, a neural network that is implemented by the control system. In this example, the neural network is a convolutional neural network (CNN), but in other examples the neural network may be another type of neural network. In some examples, the neural network may be trained as described herein, for example with reference to one or more of FIGS. 6-10.

In this example, the linear background subtraction module 1115 receives fingerprint image data 1110 and background image data 1105, and is configured to subtract the background image data 1105 from the fingerprint image data 1110 according to a linear subtraction process and to provide output fingerprint data 1120 to the linear/CNN background subtraction module 1310. According to this example, a CNN corresponding the non-linear background subtraction module 1210 is configured to receive the output fingerprint data 1120, the force data 1205 and the fingerprint image data 1305 as input and to produce the output fingerprint data 1320. In this example, the fingerprint image data 1305 is obtained via an ultrasonic fingerprint sensor using a plurality of range gate delays (RGDs). In this context, an RGD is the time interval between transmission of ultrasonic waves and activation of a receiver to detect ultrasonic waves reflected from a target object, such as a finger.

Accordingly, the process shown in FIG. 13 is very similar to that of FIG. 12, except that (1) in the example shown in FIG. 13 the fingerprint image data 1305 are also input to a module implementing a neural network and (2) the linear/CNN background subtraction module 1310 implements a linear background subtraction process and the non-linear background subtraction module 1210 implements a non-linear background removal process.

Figure 14:
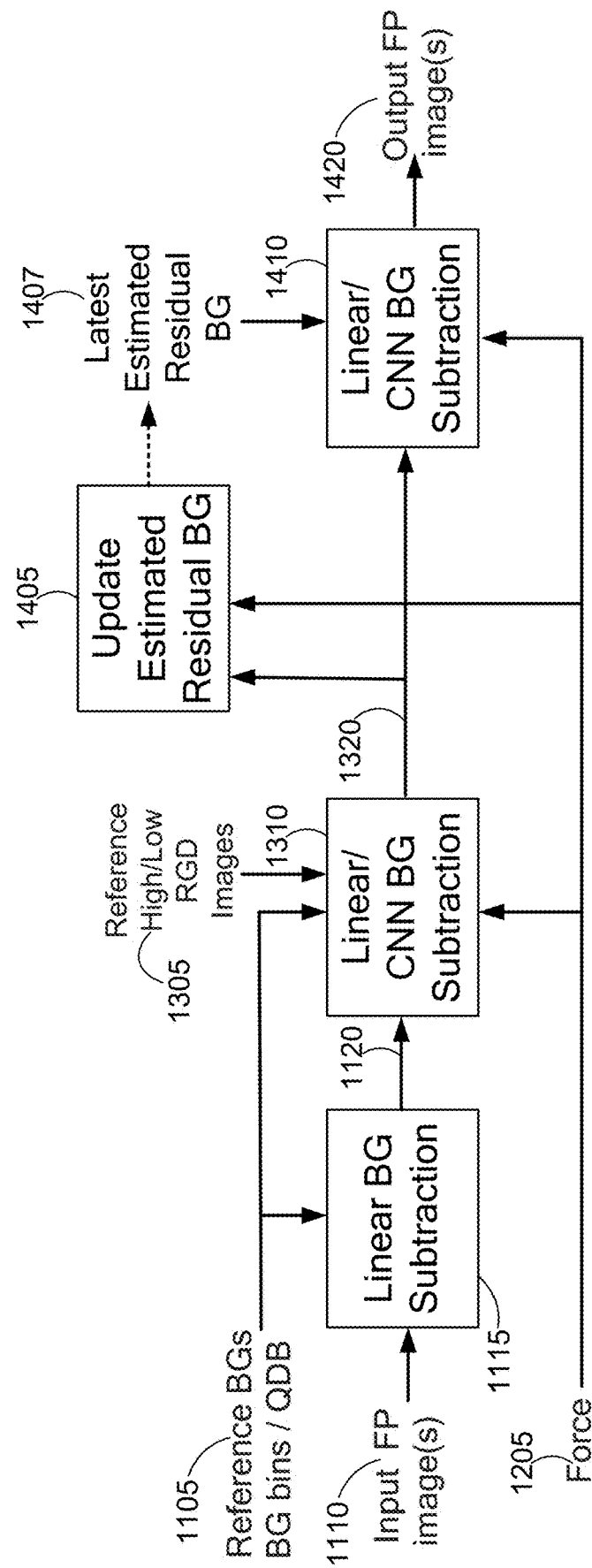
FIG. 14 depicts another currently-disclosed process of removing background image data from fingerprint image data.

FIG. 14 depicts another currently-disclosed process of removing background image data from fingerprint image data. As in previous examples, the modules shown in FIG. 14 may, for example, be implemented by the control system 106 of FIG. 1. In some such examples, the modules shown in FIG. 14 may be implemented by the control system 106 of FIG. 1 according to instructions stored on one or more computer-readable media. In this example, the linear/CNN background subtraction module 1410 is an instance of the linear/CNN background subtraction module 1310 of FIG. 13 and is, or includes, a neural network that is implemented by the control system. In this example, the neural network is a convolutional neural network (CNN), but in other examples the neural network may be another type of neural network. In some examples, the neural network may be trained as described herein, for example with reference to one or more of FIGS. 6-10.

In this example, the linear background subtraction module 1115 receives fingerprint image data 1110 and background image data 1105, and is configured to subtract the background image data 1105 from the fingerprint image data 1110 according to a linear subtraction process and to provide output fingerprint data 1120 to the linear/CNN background subtraction module 1310. According to this example, a CNN corresponding the non-linear background subtraction module 1210 is configured to receive the output fingerprint data 1120, the force data 1205 and the fingerprint image data 1305 as input and to output the fingerprint data 1320. In this example, the fingerprint image data 1305 is obtained via an ultrasonic fingerprint sensor using a plurality of range gate delays (RGDs).

Accordingly, the process shown in FIG. 14 is very similar to that of FIG. 13, except for the following: (1) the example shown in FIG. 14 includes an estimated residual background updating module 1405 that is configured to provide an updated estimate of the residual background data 1407 based on the force data 1205 and the fingerprint data 1320; and (2) the example shown in FIG. 14 includes the linear/CNN background subtraction module 1410, which is configured to produce the output fingerprint data 1420 based on the fingerprint data 1320, the force data 1205 and the updated estimate of the residual background data 1407. The updated estimate of the residual background data 1407 may, for example, be produced according to the processes described with reference to FIGS. 4 and 5.

Figure 15A:
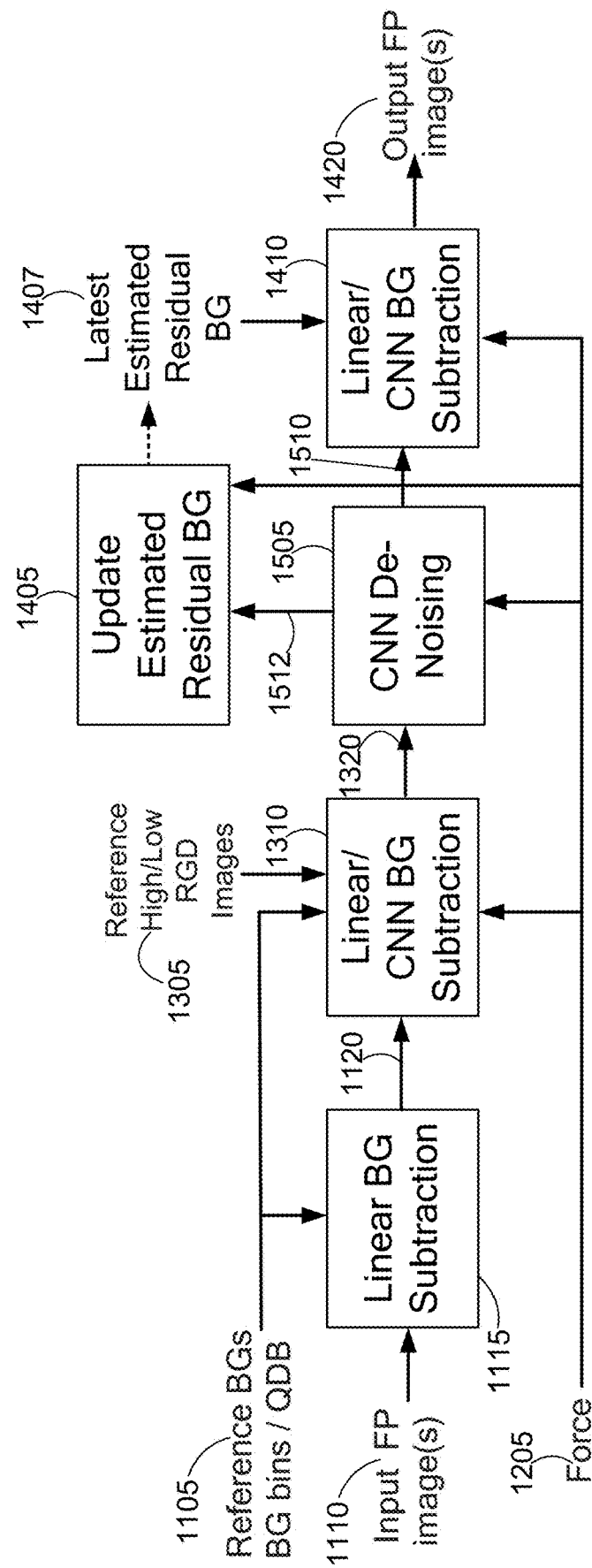
FIGS. 15A and 15B depict additional currently-disclosed processes of removing background image data from fingerprint image data.
Figure 15B:
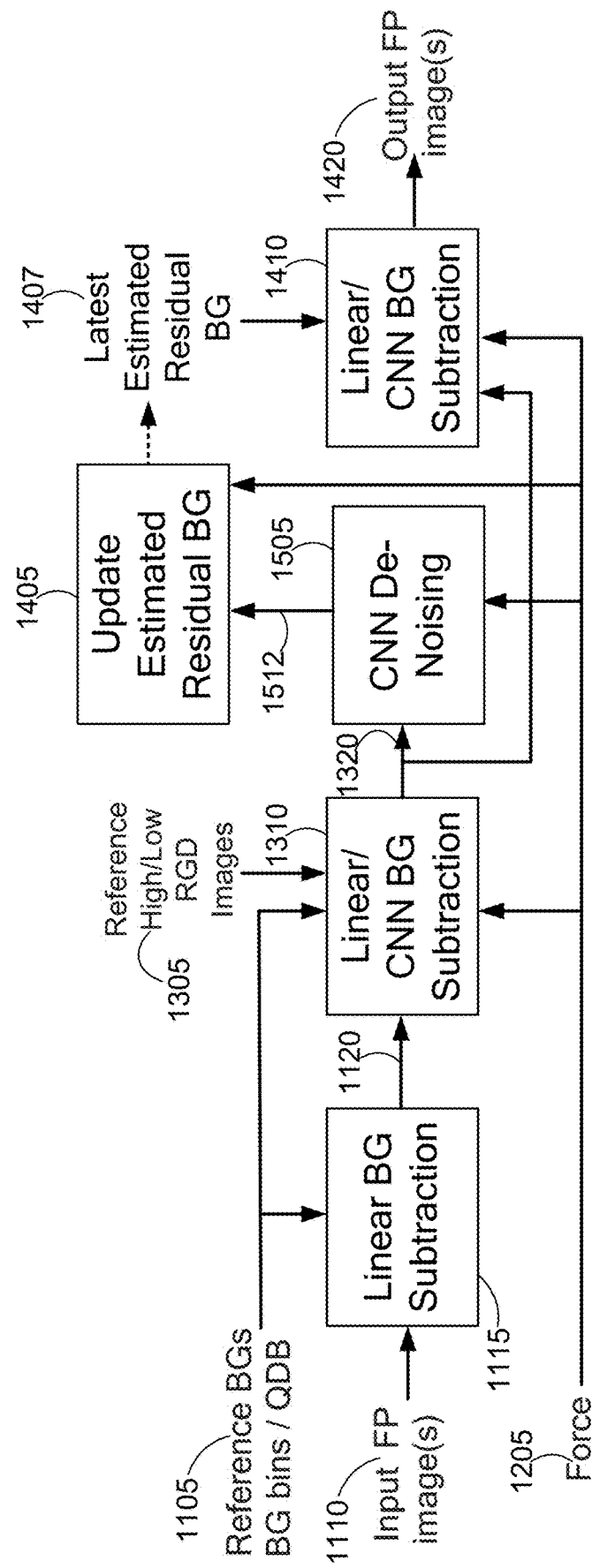

FIGS. 15A and 15B depict additional currently-disclosed processes of removing background image data from fingerprint image data. As in previous examples, the modules shown in FIGS. 15A and 15B may, for example, be implemented by the control system 106 of FIG. 1. In some such examples, the modules shown in FIGS. 15A and 15B may be implemented by the control system 106 of FIG. 1 according to instructions stored on one or more computer-readable media.

In addition to the elements described with reference to FIG. 14, the examples shown in FIGS. 15A and 15B also include a de-noising module 1505. In these examples, the de-noising module 1505 is configured to output de-noised image data 1510 and extracted noise image data 1512 based on the force data 1205 and the fingerprint data 1320. According to these examples, the de-noising module 1505 is, or includes a CNN. In other examples, the de-noising module 1505 may be, or may include, another type of neural network. In yet other examples, the de-noising module 1505 may be implemented without any type of neural network.

In the example shown in FIG. 15A, the de-noising module 1505 is configured to output de-noised image data 1510 to the linear/CNN background subtraction module 1410 and to output extracted noise image data 1512 to the estimated residual background updating module 1405. In the example shown in FIG. 15B, the de-noising module 1505 is configured to output extracted noise image data 1512 to the estimated residual background updating module 1405, but not to output the de-noised image data 1510 to the linear/CNN background subtraction module 1410.

Figure 16:
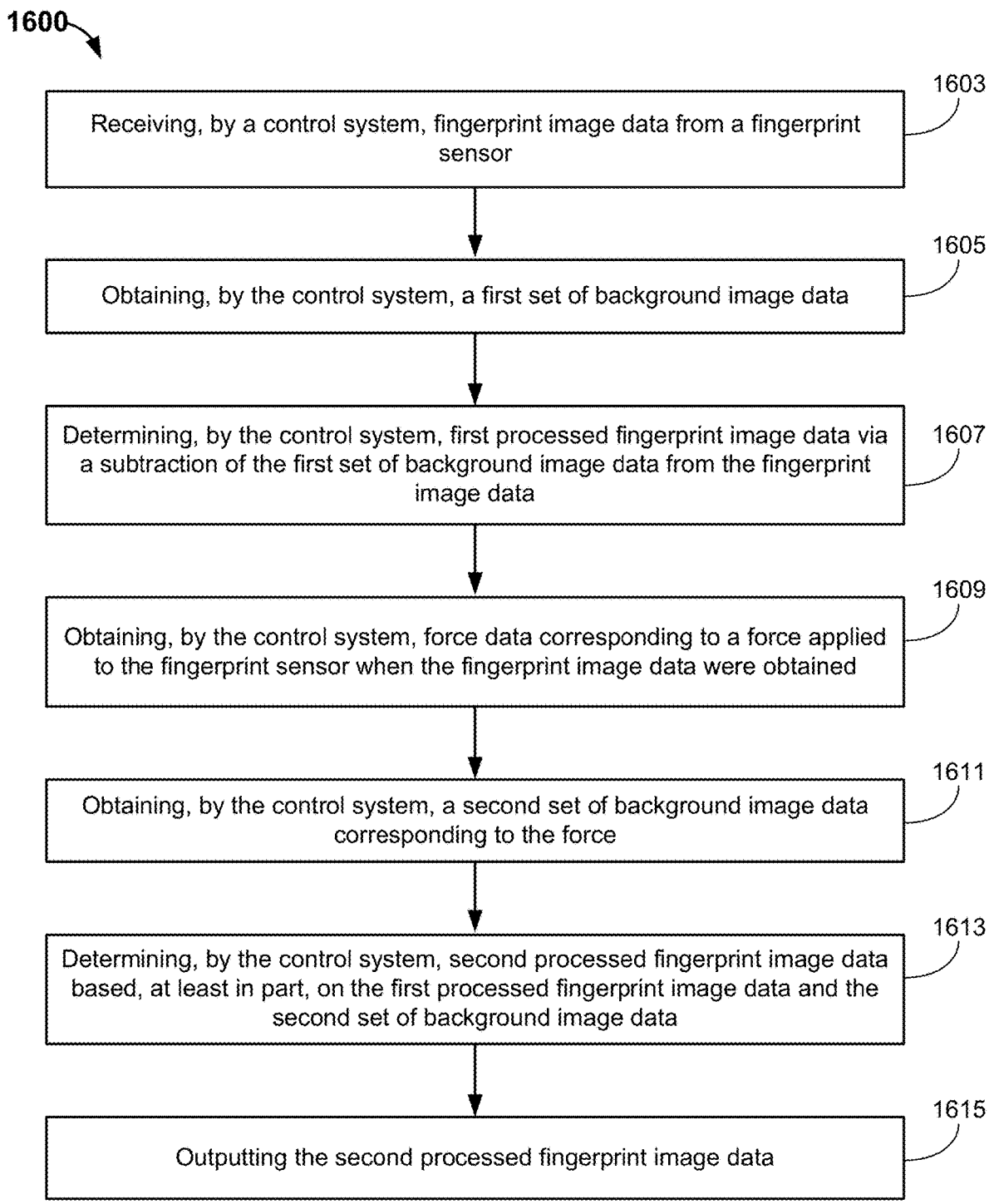
FIG. 16 is a flow diagram that provides example blocks of some methods disclosed herein.

FIG. 16 is a flow diagram that provides example blocks of some methods disclosed herein. The blocks of FIG. 16 may, for example, be performed by the apparatus 101 of any one of FIGS. 1-3, or by a similar apparatus. As with other methods disclosed herein, the method 1600 outlined in FIG. 16 may include more or fewer blocks than indicated. Moreover, the blocks of methods disclosed herein are not necessarily performed in the order indicated. In some examples, some blocks of methods disclosed herein may be performed concurrently.

According to this example, the method 1600 is a method of processing fingerprint image data. In this example, block 1603 involves receiving, by a control system (such as the control system 106), fingerprint image data from a fingerprint sensor (such as the fingerprint sensor system 102). In some examples, block 1603 may be performed as part of the "finger down" series of operations shown in FIG. 5 and described herein.

In this example, block 1605 involves obtaining, by the control system, a first set of background image data. In some examples, the first set of background image data may be a previously-obtained set of background image data that had been stored in a memory accessible by the control system.

According to this example, block 1607 involves determining, by the control system, first processed fingerprint image data via a subtraction of the first set of background image data from the fingerprint image data. Block 1607 may involve any of the linear or non-linear background removal processes disclosed herein, or similar processes.

In this example, block 1609 involves obtaining, by the control system, force data corresponding to a force applied to the fingerprint sensor when the fingerprint image data were obtained. According to some examples, the force data may be obtained from the force sensor 110 of FIG. 1, which may or may not be part of the from one of the fingerprint sensor system 102, depending on the particular implementation. In some examples, blocks 1603 and 1609 may be performed at the same time, or at substantially the same time.

According to this example, block 1611 involves obtaining, by the control system, a second set of background image data. In this example, the second set of background image data corresponds to the force obtained in block 1609. According to some examples, the second set of background image data may be obtained as part of the "finger up" series of operations shown in FIG. 5 and described herein. For example, the second set of background image data may be obtained within a time interval after a finger lift, after the finger had applied the force to the fingerprint sensor.

In this example, block 1613 involves determining, by the control system, second processed fingerprint image data based, at least in part, on the first processed fingerprint image data and the second set of background image data. According to this example, block 1615 involves outputting the second processed fingerprint image data.

According to some examples, determining the second processed fingerprint image data may involve a machine learning model. In some examples, determining the second processed fingerprint image data may involve providing the first processed fingerprint image data and the second set of background image data to a trained neural network implemented by the control system. In some such examples, the fingerprint image data may be obtained from an ultrasonic fingerprint sensor. According to some such examples, the method may involve obtaining multiple sets of fingerprint image data from the fingerprint sensor, each set of fingerprint image data corresponding to a different range gate delay. In some such examples, the method may involve determining the second processed fingerprint image data based, at least in part, on at least one set of fingerprint image data from the multiple sets of fingerprint image data.

In some examples, the method may involve estimating residual noise in the first set of background image data, the second set of background image data, or both. In some such examples, the method may involve determining an additional set of processed fingerprint image data based, at least in part, on the first processed fingerprint image data and a residual noise estimate. In some examples, the method may involve determining an additional set of processed fingerprint image data based, at least in part, the second processed fingerprint image data and the residual noise estimate. According to some examples, estimating the residual noise may be based, at least in part, on the force data. In some examples, estimating the residual noise may involve providing the fingerprint image data and noise data to a trained neural network implemented by the control system.

According to some examples, the noise data may correspond to a structure within the fingerprint sensor, or to a structure proximate the fingerprint sensor. In some examples, the noise data may correspond to a structure within, or proximate, a particular area of the fingerprint sensor. The structure may, for example, correspond to at least a portion of a patterned backer layer of, or proximate, the fingerprint sensor.

Figure 17A:
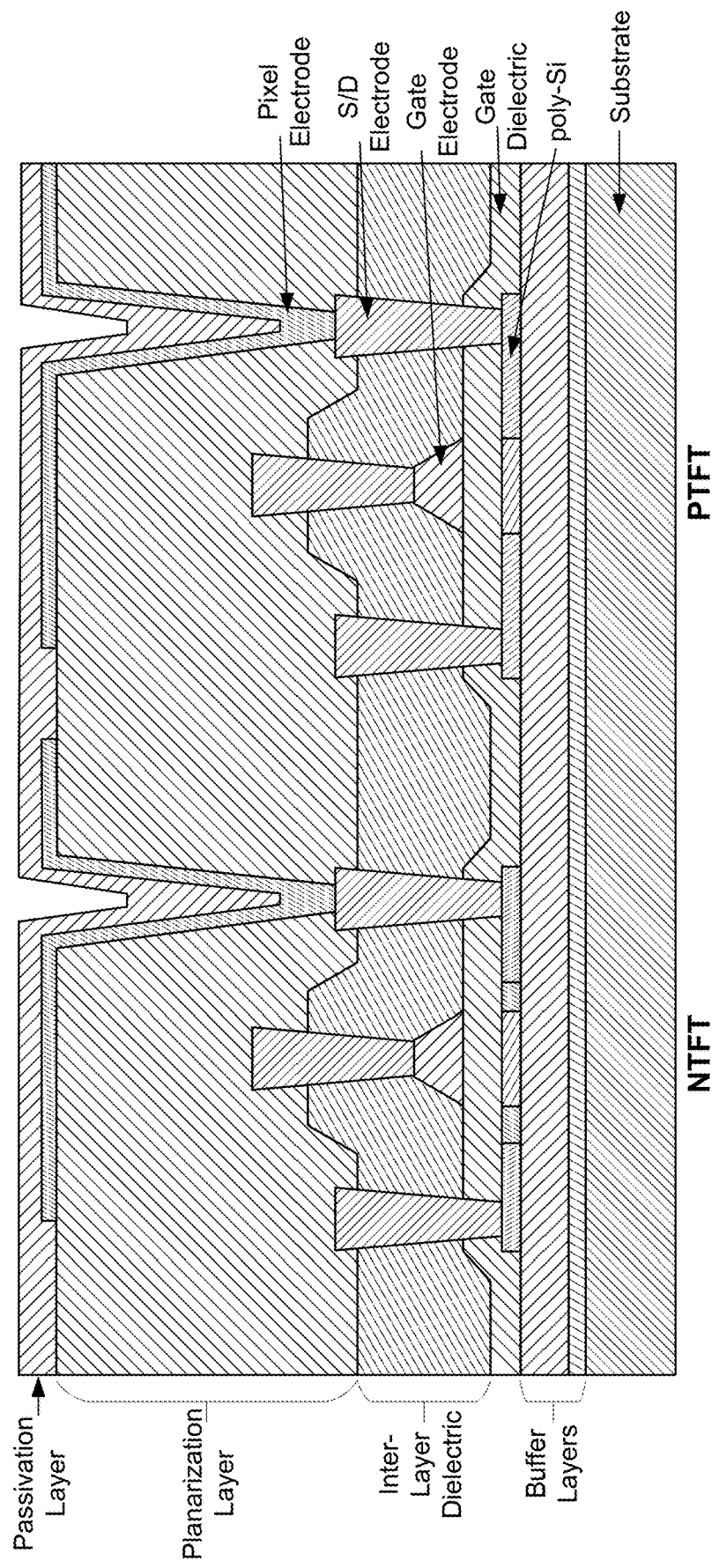
FIGS. 17A, 17B, 17C and 17D show examples of force sensors that are integrated into the circuitry of ultrasonic fingerprint sensors.

FIGS. 17A, 17B, 17C and 17D show examples of force sensors that are integrated into the circuitry of ultrasonic fingerprint sensors. The implementations shown in FIGS. 17A, 17B, 17C and 17D are examples of the combined force sensor 116 and ultrasonic fingerprint sensor 102 that is shown in FIG. 2B. FIG. 17A shows a cross-section through one example of a metal-oxide-semiconductor field-effect transistor (MOSFET), which is a complementary metal-oxide-semiconductor (CMOS) in this example. In FIG. 17A, only a single n-type thin-film transistor (NTFT) and a single p-type TFT (PTFT) are shown. However, an actual ultrasonic fingerprint sensor having this type of structure would normally have many NTFT/PTFT pairs (for example, tens of thousands of NTFT/PTFT pairs).

Depending on the particular implementation, portions of different conductive layers of the stack shown in FIG. 17A may be used for a pressure sensor. In some examples, a portion of the pixel electrode layer may be used for the pressure sensor. In other examples, a portion of the source/drain (S/D) electrode layer may be used for the pressure sensor. According to some implementations, a portion of the gate electrode layer may be used for the pressure sensor. In some examples, a portion of the polycrystalline silicon (poly-Si) layer may be used for the pressure sensor. In some implementations, the poly-Si layer may include low-temperature polycrystalline silicon (LTPS).

Figure 17B:
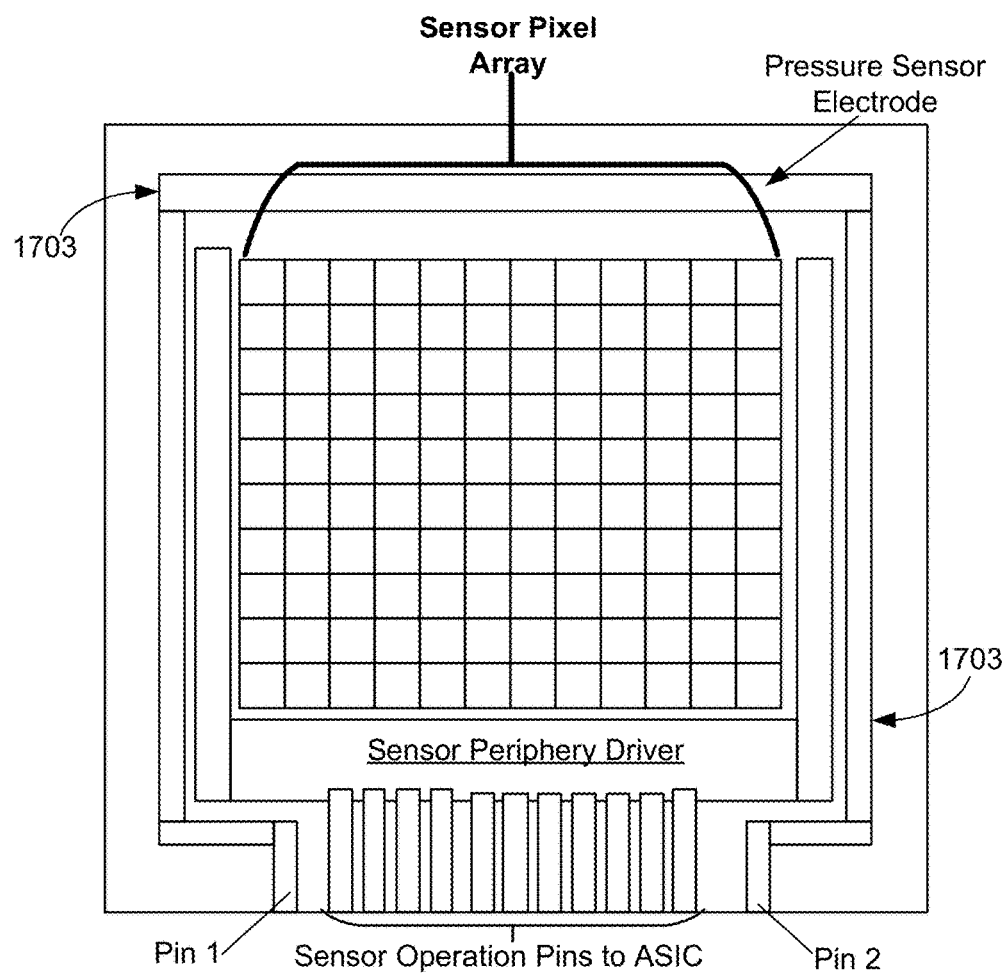

FIG. 17B shows an example of a top view of an ultrasonic fingerprint sensor. In this example, the sensor pixel array and the sensor periphery driver each include multiple instances of a CMOS such as that shown in FIG. 17A. In this instance, a portion of the pixel electrode layer is configured to be used as a conductive part of a pressure sensor. According to this implementation, pin 1, pin 2 and the connected portions 1703 of the pixel electrode layer are configured as a pressure sensor electrode. In this example the other pins, which are labeled in FIG. 17A as "sensor operation pins to ASIC," may be used to connect the ultrasonic fingerprint sensor to a corresponding part of the control system. The control system may or may not include an ASIC depending on the particular implementation. According to some examples, the pressure sensor may also include a portion of one or more layers of piezoelectric material included in the ultrasonic fingerprint sensor.

Figure 17C:
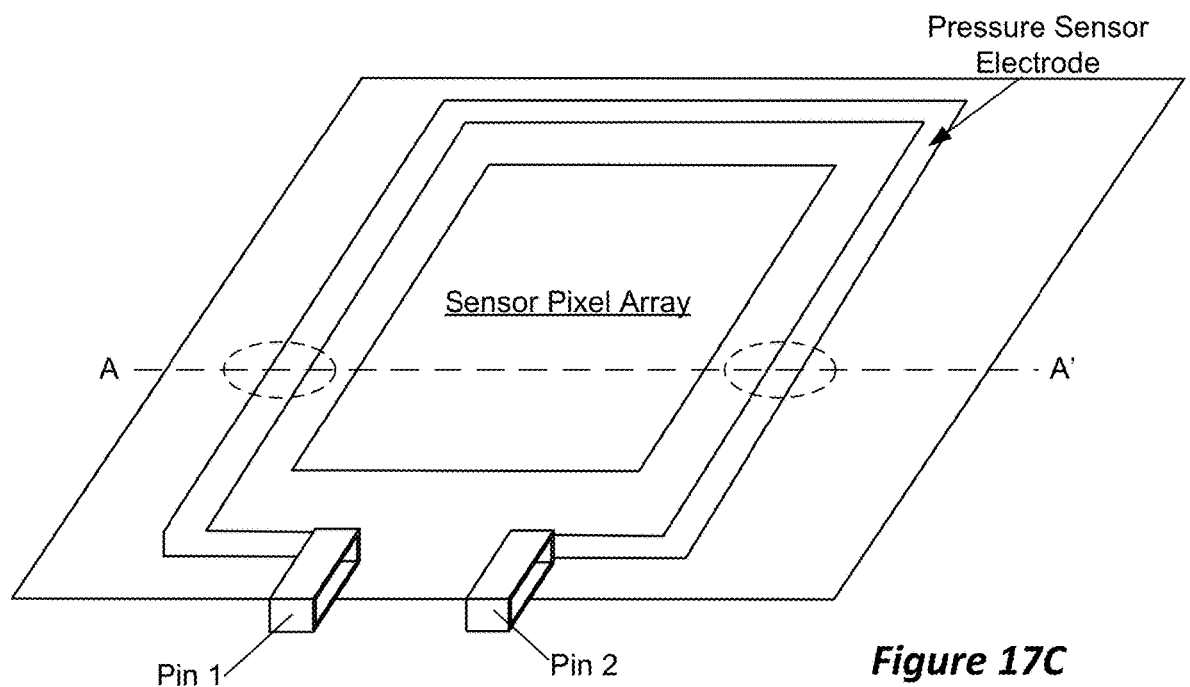

FIG. 17C shows a perspective view of the ultrasonic fingerprint sensor shown in FIG. 17B. FIG. 17C also shows cross-section line A/A', which corresponds with the cross-section shown in FIG. 17D.

Figure 17D:
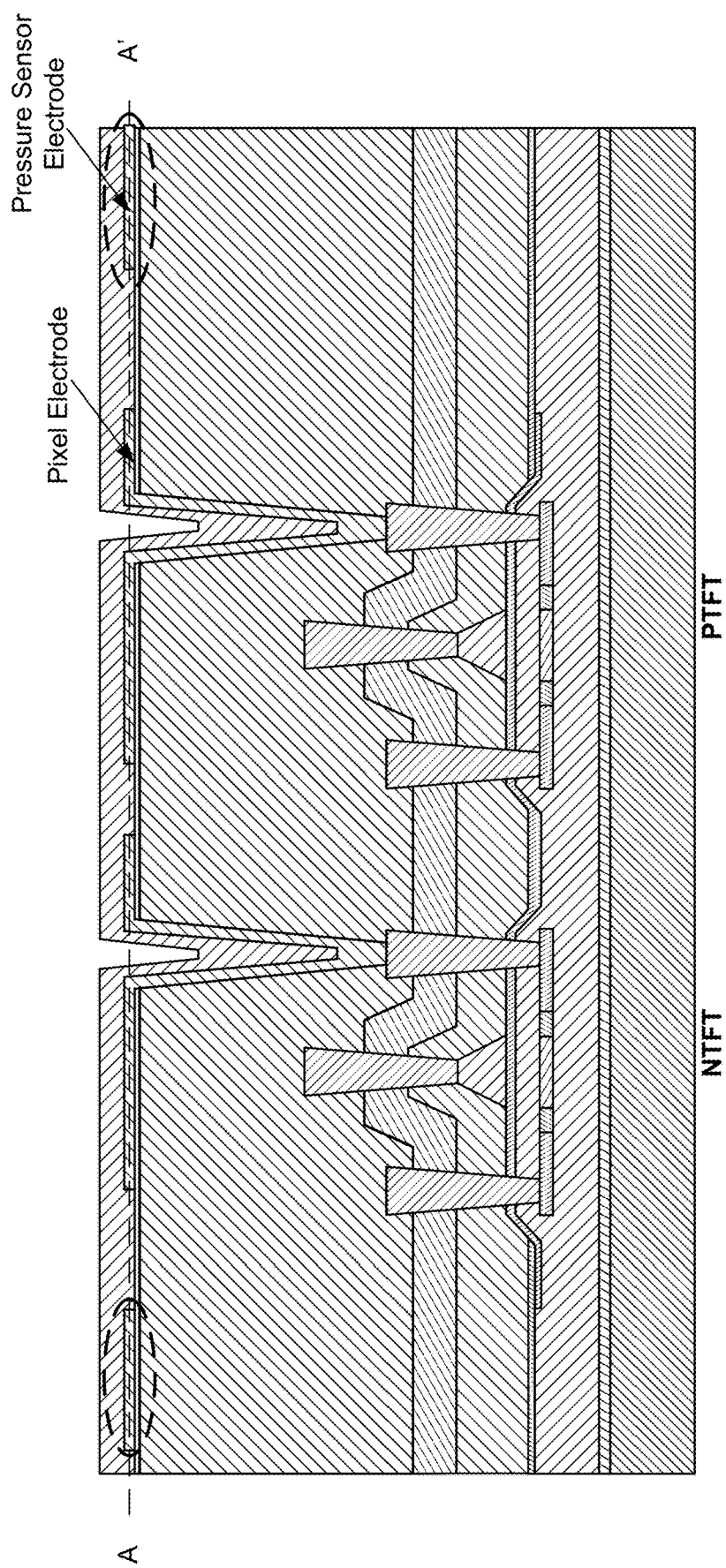

FIG. 17D is a simplified cross-section through the ultrasonic fingerprint sensor shown in FIG. 17C. Like FIG. 17A, the example of FIG. 17D only shows a single NTFT/PTFT pair, whereas an actual ultrasonic fingerprint sensor having this type of structure would normally have many NTFT/PTFT pairs. The cross-section line A/A' is shown traversing the pixel electrode layer and includes the pixel electrodes and the pressure sensor electrodes in this example. Alternative examples in which a portion of a deeper layer (such as a portion of the source/drain (S/D) electrode layer, a portion of the gate electrode layer or a portion of the poly-Si layer) is used to form the pressure sensor electrodes, the device may include vias to connect the deeper layers to a chip pin or other corresponding part of the control system.

Implementation examples are described in the following numbered clauses:

1. A method of processing fingerprint image data, the method including: receiving, by a control system, fingerprint image data from a fingerprint sensor; obtaining, by the control system, a first set of background image data; determining, by the control system, first processed fingerprint image data via a subtraction of the first set of background image data from the fingerprint image data; obtaining, by the control system, force data corresponding to a force applied to the fingerprint sensor when the fingerprint image data were obtained; obtaining, by the control system, a second set of background image data corresponding to the force; determining, by the control system, second processed fingerprint image data based, at least in part, on the first processed fingerprint image data and the second set of background image data; and outputting the second processed fingerprint image data.

2. The method of clause 1, where determining the second processed fingerprint image data involves a machine learning model.

3. The method of clause 1 or clause 1, where determining the second processed fingerprint image data involves providing the first processed fingerprint image data and the second set of background image data to a trained neural network implemented by the control system.

4. The method of any one of clauses 1-3, where the fingerprint image data is obtained from an ultrasonic fingerprint sensor, further including: obtaining multiple sets of fingerprint image data from the fingerprint sensor, each set of fingerprint image data corresponding to a different range gate delay; and determining the second processed fingerprint image data based, in part, on at least one set of fingerprint image data from the multiple sets of fingerprint image data.

5. The method of any one of clauses 1-4, further including estimating residual noise in the first set of background image data, the second set of background image data, or both.

6. The method of clause 5, further including determining an additional set of processed fingerprint image data based, at least in part, on the first processed fingerprint image data and a residual noise estimate or on the second processed fingerprint image data and the residual noise estimate.

7. The method of clause 5 or clause 6, where estimating the residual noise is based, at least in part, on the force data.

8. The method of any one of clauses 5-7, where estimating the residual noise involves providing the fingerprint image data and noise data to a trained neural network implemented by the control system.

9. The method of clause 8, where the noise data corresponds to a structure within, or proximate, the fingerprint sensor.

10. The method of clause 9, where the noise data corresponds to a structure within, or proximate, a particular area of the fingerprint sensor.

11. The method of clause 9 or clause 10, where the structure corresponds to a patterned backer layer of, or proximate, the fingerprint sensor.

12. An apparatus, including: a fingerprint sensor; and a control system configured to: receive fingerprint image data from the fingerprint sensor; obtain a first set of background image data; determine first processed fingerprint image data via a subtraction of the first set of background image data from the fingerprint image data; obtain force data corresponding to a force applied to the fingerprint sensor when the fingerprint image data were obtained; obtain a second set of background image data corresponding to the force; determine second processed fingerprint image data based, at least in part, on the first processed fingerprint image data and the second set of background image data; and output the second processed fingerprint image data.

13. The apparatus of clause 12, where determining the second processed fingerprint image data involves a machine learning model.

14. The apparatus of clause 12 or clause 13, where determining the second processed fingerprint image data involves providing the first processed fingerprint image data and the second set of background image data to a trained neural network implemented by the control system.

15. The apparatus of any one of clauses 12-14, where the fingerprint sensor is, or includes, an ultrasonic fingerprint sensor and where the control system is further configured to: obtain multiple sets of fingerprint image data from the fingerprint sensor, each set of fingerprint image data corresponding to a different range gate delay; and determine the second processed fingerprint image data based, in part, on at least one set of fingerprint image data from the multiple sets of fingerprint image data.

16. The apparatus of any one of clauses 12-15, where the control system is further configured to estimate residual noise in the first set of background image data, the second set of background image data, or both.

17. The apparatus of clause 16, where the control system is further configured to determine an additional set of processed fingerprint image data based, at least in part, on the first processed fingerprint image data and a residual noise estimate or on the second processed fingerprint image data and the residual noise estimate.

18. The apparatus of clause 16 or clause 17, where estimating the residual noise is based, at least in part, on the force data.

19. The apparatus of any one of clauses 16-18, where estimating the residual noise involves providing the fingerprint image data and noise data to a trained neural network implemented by the control system.

20. The apparatus of clause 19, where the apparatus includes a backer layer proximate the fingerprint sensor and where the noise data corresponds to the backer layer.

21. The apparatus of clause 20, where the backer layer is a patterned backer layer.

22. The apparatus of any one of clauses 12-21, where the apparatus includes a stiffener layer.

23. The apparatus of any one of clauses 12-22, where the apparatus is a foldable mobile device.

24. An apparatus, including: a fingerprint sensor; and control means for: receiving fingerprint image data from the fingerprint sensor; obtaining a first set of background image data; determining first processed fingerprint image data via a subtraction of the first set of background image data from the fingerprint image data; obtaining force data corresponding to a force applied to the fingerprint sensor when the fingerprint image data were obtained; obtaining a second set of background image data corresponding to the force; determining second processed fingerprint image data based, at least in part, on the first processed fingerprint image data and the second set of background image data; and outputting the second processed fingerprint image data.

25. The apparatus of clause 24, where determining the second processed fingerprint image data involves a machine learning model.

26. The apparatus of clause 24 or clause 25, where determining the second processed fingerprint image data involves providing the first processed fingerprint image data and the second set of background image data to a trained neural network implemented by the control means.

27. The apparatus of any one of clauses 24-26, where the fingerprint sensor is, or includes, an ultrasonic fingerprint sensor and where the control means is further configured for: obtaining multiple sets of fingerprint image data from the fingerprint sensor, each set of fingerprint image data corresponding to a different range gate delay; and determining the second processed fingerprint image data based, in part, on at least one set of fingerprint image data from the multiple sets of fingerprint image data.

28. One or more non-transitory computer-readable media having instructions for performing a method stored thereon, the method including: receiving, by a control system, fingerprint image data from a fingerprint sensor; obtaining, by the control system, a first set of background image data; determining, by the control system, first processed fingerprint image data via a subtraction of the first set of background image data from the fingerprint image data; obtaining, by the control system, force data corresponding to a force applied to the fingerprint sensor when the fingerprint image data were obtained; obtaining, by the control system, a second set of background image data corresponding to the force; determining, by the control system, second processed fingerprint image data based, at least in part, on the first processed fingerprint image data and the second set of background image data; and outputting the second processed fingerprint image data.

29. The one or more non-transitory computer-readable media of clause 28, where determining the second processed fingerprint image data involves a machine learning model.

30. The one or more non-transitory computer-readable media of clause 28 or clause 29, where determining the second processed fingerprint image data involves providing the first processed fingerprint image data and the second set of background image data to a trained neural network implemented by the control system.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. A method of processing fingerprint image data, the method comprising:
   receiving, by a control system, fingerprint image data from a fingerprint sensor;
   obtaining, by the control system, a first set of background image data;
   determining, by the control system, first processed fingerprint image data via a subtraction of the first set of background image data from the fingerprint image data;
   obtaining, by the control system, force data corresponding to a force applied to the fingerprint sensor when the fingerprint image data were obtained;
   obtaining, by the control system, a second set of background image data corresponding to the force;
   determining, by the control system, second processed fingerprint image data based, at least in part, on the first processed fingerprint image data and the second set of background image data; and
   outputting the second processed fingerprint image data.

2. The method of claim 1, wherein determining the second processed fingerprint image data involves a machine learning model.

3. The method of claim 1, wherein determining the second processed fingerprint image data involves providing the first processed fingerprint image data and the second set of background image data to a trained neural network implemented by the control system.

4. The method of claim 1, wherein the fingerprint image data is obtained from an ultrasonic fingerprint sensor, further comprising:
   obtaining multiple sets of fingerprint image data from the fingerprint sensor, each set of fingerprint image data corresponding to a different range gate delay; and
   determining the second processed fingerprint image data based, in part, on at least one set of fingerprint image data from the multiple sets of fingerprint image data.

5. The method of claim 1, further comprising estimating residual noise in the first set of background image data, the second set of background image data, or both.

6. The method of claim 5, further comprising determining an additional set of processed fingerprint image data based, at least in part, on the first processed fingerprint image data and a residual noise estimate or on the second processed fingerprint image data and the residual noise estimate.

7. The method of claim 5, wherein estimating the residual noise is based, at least in part, on the force data.

8. The method of claim 5, wherein estimating the residual noise involves providing the fingerprint image data and noise data to a trained neural network implemented by the control system.

9. The method of claim 8, wherein the noise data corresponds to a structure within, or proximate, the fingerprint sensor.

10. The method of claim 9, wherein the noise data corresponds to a structure within, or proximate, a particular area of the fingerprint sensor.

11. The method of claim 9, wherein the structure corresponds to a patterned backer layer of, or proximate, the fingerprint sensor.

12. An apparatus, comprising:
   a fingerprint sensor; and
   a control system configured to:
     receive fingerprint image data from the fingerprint sensor;
     obtain a first set of background image data;

determine first processed fingerprint image data via a subtraction of the first set of background image data from the fingerprint image data;

obtain force data corresponding to a force applied to the fingerprint sensor when the fingerprint image data were obtained;

obtain a second set of background image data corresponding to the force;

determine second processed fingerprint image data based, at least in part, on the first processed fingerprint image data and the second set of background image data; and output the second processed fingerprint image data.

13. The apparatus of claim 12, wherein determining the second processed fingerprint image data involves a machine learning model.

14. The apparatus of claim 12, wherein determining the second processed fingerprint image data involves providing the first processed fingerprint image data and the second set of background image data to a trained neural network implemented by the control system.

15. The apparatus of claim 12, wherein the fingerprint sensor is, or includes, an ultrasonic fingerprint sensor and wherein the control system is further configured to:

obtain multiple sets of fingerprint image data from the fingerprint sensor, each set of fingerprint image data corresponding to a different range gate delay; and determine the second processed fingerprint image data based, in part, on at least one set of fingerprint image data from the multiple sets of fingerprint image data.

16. The apparatus of claim 12, wherein the control system is further configured to estimate residual noise in the first set of background image data, the second set of background image data, or both.

17. The apparatus of claim 16, wherein the control system is further configured to determine an additional set of processed fingerprint image data based, at least in part, on the first processed fingerprint image data and a residual noise estimate or on the second processed fingerprint image data and the residual noise estimate.

18. The apparatus of claim 16, wherein estimating the residual noise is based, at least in part, on the force data.

19. The apparatus of claim 16, wherein estimating the residual noise involves providing the fingerprint image data and noise data to a trained neural network implemented by the control system.

20. The apparatus of claim 19, wherein the apparatus includes a backer layer proximate the fingerprint sensor and wherein the noise data corresponds to the backer layer.

21. The apparatus of claim 20, wherein the backer layer is a patterned backer layer.

22. The apparatus of claim 12, wherein the apparatus includes a stiffener layer.

23. The apparatus of claim 12, wherein the apparatus is a foldable mobile device.

24. An apparatus, comprising:
a fingerprint sensor; and
control means for:
receiving fingerprint image data from the fingerprint sensor;
obtaining a first set of background image data;

determining first processed fingerprint image data via a subtraction of the first set of background image data from the fingerprint image data;

obtaining force data corresponding to a force applied to the fingerprint sensor when the fingerprint image data were obtained;

obtaining a second set of background image data corresponding to the force;

determining second processed fingerprint image data based, at least in part, on the first processed fingerprint image data and the second set of background image data; and outputting the second processed fingerprint image data.

25. The apparatus of claim 24, wherein determining the second processed fingerprint image data involves a machine learning model.

26. The apparatus of claim 24, wherein determining the second processed fingerprint image data involves providing the first processed fingerprint image data and the second set of background image data to a trained neural network implemented by the control means.

27. The apparatus of claim 24, wherein the fingerprint sensor is, or includes, an ultrasonic fingerprint sensor and wherein the control means is further configured for:

obtaining multiple sets of fingerprint image data from the fingerprint sensor, each set of fingerprint image data corresponding to a different range gate delay; and determining the second processed fingerprint image data based, in part, on at least one set of fingerprint image data from the multiple sets of fingerprint image data.

28. One or more non-transitory computer-readable media having instructions for performing a method stored thereon, the method comprising:

receiving, by a control system, fingerprint image data from a fingerprint sensor;

obtaining, by the control system, a first set of background image data;

determining, by the control system, first processed fingerprint image data via a subtraction of the first set of background image data from the fingerprint image data;

obtaining, by the control system, force data corresponding to a force applied to the fingerprint sensor when the fingerprint image data were obtained;

obtaining, by the control system, a second set of background image data corresponding to the force;

determining, by the control system, second processed fingerprint image data based, at least in part, on the first processed fingerprint image data and the second set of background image data; and outputting the second processed fingerprint image data.

29. The one or more non-transitory computer-readable media of claim 28, wherein determining the second processed fingerprint image data involves a machine learning model.

30. The one or more non-transitory computer-readable media of claim 28, wherein determining the second processed fingerprint image data involves providing the first processed fingerprint image data and the second set of background image data to a trained neural network implemented by the control system.

* * * * *